United States Patent
Zhang et al.

(10) Patent No.: US 12,275,641 B2
(45) Date of Patent: Apr. 15, 2025

(54) STABILIZED POROUS SILICON STRUCTURE FOR HIGHLY STABLE SILICON ANODE AND METHODS OF MAKING

(71) Applicant: Battelle Memorial Institute, Richland, WA (US)

(72) Inventors: Ji-Guang Zhang, Richland, WA (US); Ran Yi, Richland, WA (US); Qiuyan Li, Richland, WA (US); Sujong Chae, Richland, WA (US); Xiaolin Li, Richland, WA (US); Yaobin Xu, Richland, WA (US); Chongmin Wang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 620 days.

(21) Appl. No.: 15/929,749

(22) Filed: May 20, 2020

(65) Prior Publication Data

US 2021/0122641 A1 Apr. 29, 2021

Related U.S. Application Data

(60) Provisional application No. 62/927,459, filed on Oct. 29, 2019.

(51) Int. Cl.
*C01B 33/02* (2006.01)
*C01B 32/984* (2017.01)
(Continued)

(52) U.S. Cl.
CPC ............ *C01B 33/02* (2013.01); *C01B 32/984* (2017.08); *H01M 4/583* (2013.01);
(Continued)

(58) Field of Classification Search
CPC ...... C01B 33/02; C01B 32/984; H01M 4/583; H01M 10/0525; H01M 10/0568; H01M 10/0569; H01M 10/44; C01P 2006/90
(Continued)

(56) References Cited

U.S. PATENT DOCUMENTS 8,617,746 B2 * 12/2013 Mah .................. H01B 1/24
429/236
9,039,788 B2   5/2015 Xu et al.
(Continued)

FOREIGN PATENT DOCUMENTS

CN   108269989 A   7/2018
CN   108963203 A   12/2018
EP   3 264 505 A1   1/2018

OTHER PUBLICATIONS

Yi et al., "Micro-sized Si—C Composite with Interconnected Nanoscale Building Blocks as High-Performance Anodes for Practical Application in Lithium-Ion Batters," *Adv. Energy Materials* 2013, 3:295-300.
(Continued)

*Primary Examiner* — Matthew T Martin
*Assistant Examiner* — Paul Christian St Wyrough
(74) *Attorney, Agent, or Firm* — Klarquist Sparkman, LLP

(57) ABSTRACT

Stabilized porous silicon particles are disclosed. The particles include a porous silicon particle comprising a plurality of interconnected silicon nanoparticles and (i) a heterogeneous layer comprising a discontinuous SiC coating that is discontinuous across a portion of pore surfaces and across a portion of an outer surface of the porous silicon particle, and a continuous carbon coating that covers outer surfaces of the discontinuous SiC coating, and remaining portions of the pore surfaces and the outer surface of the porous silicon particle, or (ii) a continuous carbon coating on surfaces of
(Continued)

the porous silicon particle, including the outer surface and pore surfaces. Methods of making the stabilized porous silicon particles also are disclosed.

11 Claims, 6 Drawing Sheets

(51) Int. Cl.
    *H01M 4/583*     (2010.01)
    *H01M 10/0525*     (2010.01)
    *H01M 10/0568*     (2010.01)
    *H01M 10/0569*     (2010.01)
    *H01M 10/44*     (2006.01)

(52) U.S. Cl.
    CPC ... *H01M 10/0525* (2013.01); *H01M 10/0568* (2013.01); *H01M 10/0569* (2013.01); *H01M 10/44* (2013.01); *C01P 2006/90* (2013.01)

(58) Field of Classification Search
    USPC ........................................................ 429/218
    See application file for complete search history.

(56) References Cited

U.S. PATENT DOCUMENTS

| | | |
|---|---|---|
| 9,269,949 B2 | 2/2016 | Wang et al. |
| 2007/0212538 A1 | 9/2007 | Niu |
| 2009/0186267 A1* | 7/2009 | Tiegs ...................... H01M 4/38 429/129 |
| 2011/0200874 A1 | 8/2011 | Ono et al. |
| 2014/0106219 A1 | 4/2014 | Wang et al. |
| 2017/0047580 A1 | 2/2017 | Cho et al. |
| 2018/0034056 A1 | 2/2018 | Cho et al. |
| 2018/0145316 A1* | 5/2018 | Moon ................... H01M 4/134 |
| 2019/0148775 A1 | 5/2019 | Zhang et al. |
| 2019/0173125 A1 | 6/2019 | Lanning et al. |
| 2020/0161635 A1* | 5/2020 | Liu ....................... H01M 4/366 |

OTHER PUBLICATIONS

Yi et al., Supporting Information for *Adv. Energy Mater.*, DOI: 10.1002/aenm.201200857, 2013, 10 pages.

Yu et al., "Silicon Carbide as a Protective Layer to Stabilize Si-Based Anodes by Inhibiting Chemical Reactions", *Nano Lett.* 2019, 19:5124-5132.

International Search Report and Written Opinion, dated Mar. 3, 2021, issued in corresponding International Application No. PCT/US20/57620, 14 pages.

Extended European Search Report, dated Mar. 20, 2024, issued in corresponding European Application No. 20880826.1. 11 pages.

* cited by examiner

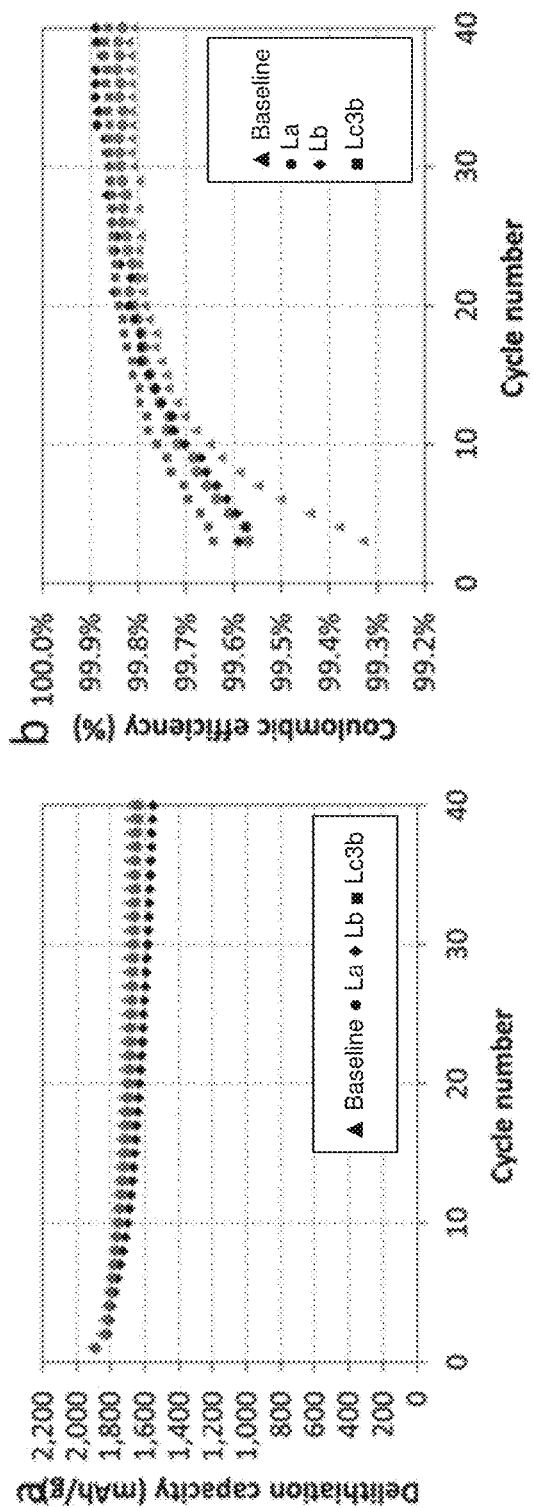
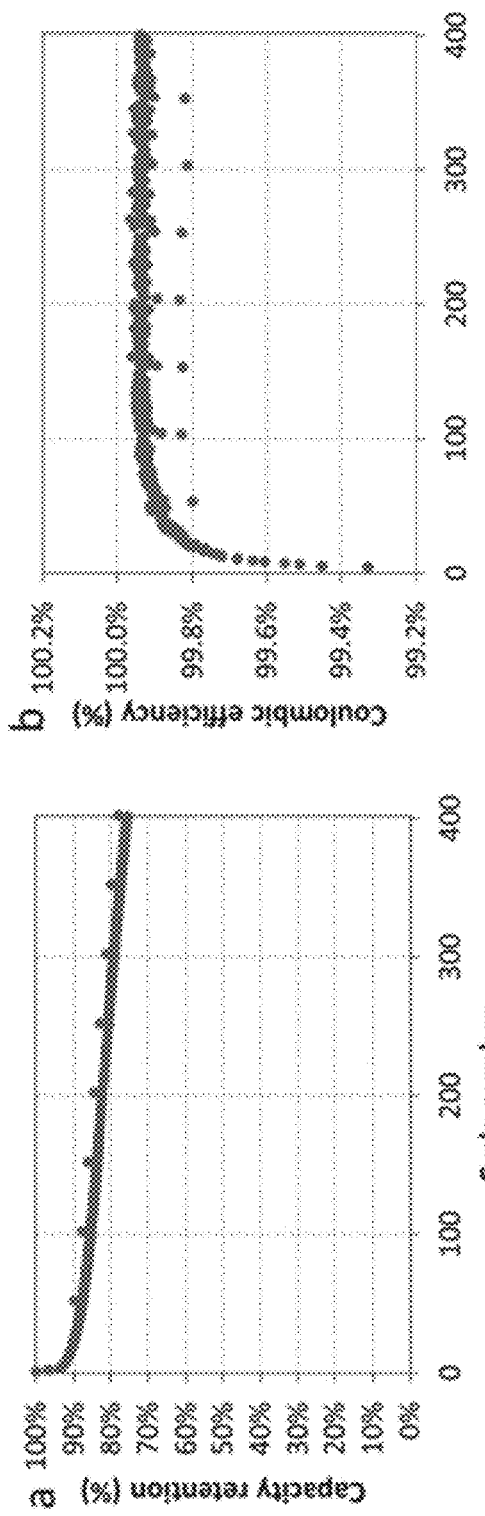
FIG. 7A FIG. 7B
FIG. 8A FIG. 8B

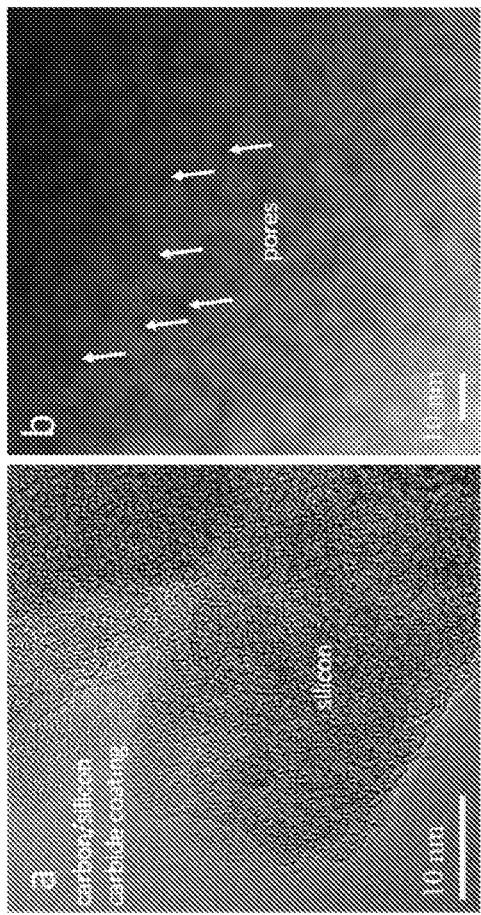
FIG. 11A
FIG. 11B
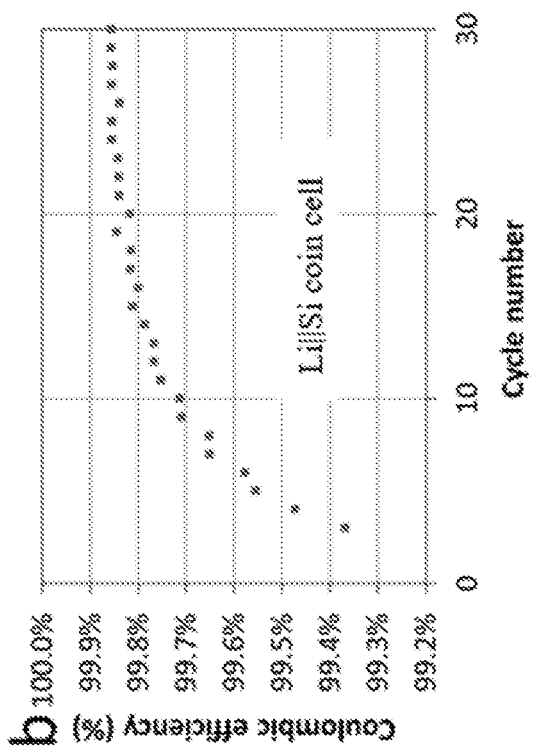
FIG. 12A
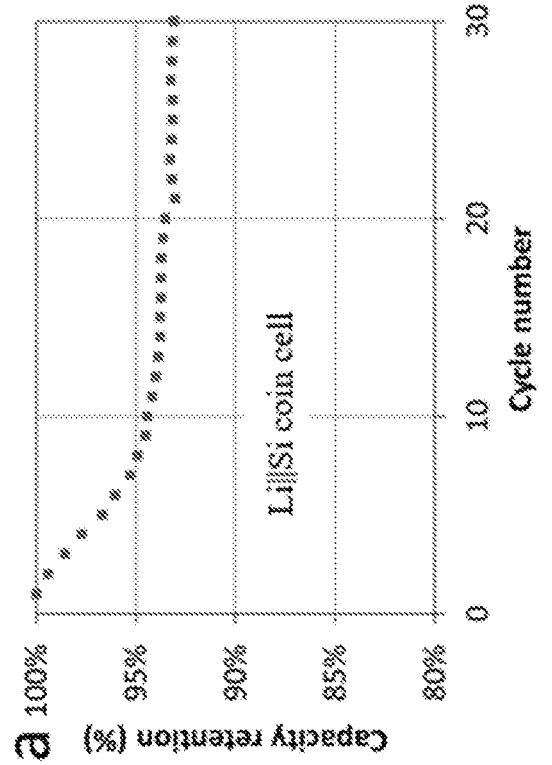
FIG. 12B

STABILIZED POROUS SILICON STRUCTURE FOR HIGHLY STABLE SILICON ANODE AND METHODS OF MAKING

CROSS REFERENCE TO RELATED APPLICATION

This application claims the benefit of the earlier filing date of U.S. Provisional Application No. 62/927,459, filed Oct. 29, 2019, which is incorporated by reference herein in its entirety.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

This invention concerns stabilized porous silicon particles, as well as methods of making the stabilized particles and anodes including the stabilized particles.

SUMMARY

Embodiments of stabilized porous silicon particles, as well as methods for making the particles are disclosed. The stabilized porous silicon particles may be used in anodes, such as anodes for lithium ion batteries. In some embodiments, the stabilized porous silicon particles are coated with a heterogeneous layer comprising a discontinuous silicon carbide (SiC) coating and a continuous carbon coating. In other embodiments, the stabilized porous silicon particles are coated with carbon.

In some embodiments, a coated porous silicon particle comprises a porous silicon particle comprising a plurality of interconnected silicon nanoparticles, interconnected silicon nanoparticles being connected to at least one other silicon nanoparticle, and a plurality of pores defined by the interconnected silicon nanoparticles, the pores including outwardly opening surface pores and internal pores; a heterogeneous layer comprising a discontinuous SiC coating that is discontinuous across a portion of pore surfaces and across a portion of an outer surface of the porous silicon particle, and a continuous carbon coating that covers (i) outer surfaces of the discontinuous SiC coating and (ii) remaining portions of the pore surfaces and the outer surface of the porous silicon particle. The heterogeneous layer may have an average thickness within a range of from 1 nm to 10 nm. The discontinuous SiC coating may have a thickness of less than 1 nm.

In any of the foregoing embodiments, the discontinuous SiC coating may cover from 20% to 90% of the pore surfaces and outer surface of the porous silicon particle. In any of the foregoing embodiments, the continuous carbon coating may extend across the outwardly opening surface pores of the porous silicon particle, thereby providing an outer nonporous carbon coating, and the heterogeneous layer may coat internal pore surfaces but does not completely fill the internal pores of the porous silicon particle.

In some embodiments, a method for making carbon/silicon carbide-coated porous silicon particles includes (a) providing porous silicon particles having H-terminated surface Si atoms; (b) combining the porous silicon particles with carbon-containing precursor molecules to provide a mixture of the porous silicon particles and carbon-containing precursor molecules, wherein the carbon-containing precursor molecules surround outer surfaces of the porous silicon particles and are infiltrated into pores of the porous silicon particles; (c) heating the mixture under conditions effective to break H—Si bonds of a portion of the H-terminated surface Si atoms to provide non-H-terminated surface Si atoms and form bonds between the non-H-terminated surface Si atoms and carbon atoms of some of the carbon-containing precursor molecules, thereby forming intermediate particles comprising Si-carbon-containing precursor moieties and unreacted carbon-containing precursor molecules surrounding the porous silicon particles and infiltrated into the pores; and (d) heating the intermediate particles under conditions effective to form SiC from the Si-carbon-containing precursor moieties and carbonize the remaining unreacted carbon-containing precursors, thereby forming particles comprising a porous silicon particle and a heterogeneous layer on the porous silicon particle, the heterogeneous layer comprising a discontinuous SiC coating that is discontinuous across a portion of pore surfaces and across a portion of an outer surface of the porous silicon particle, and a continuous carbon coating that covers (i) outer surfaces of the SiC coating and (ii) remaining portions of the pore surfaces and the outer surface of the porous silicon particle, thereby forming C/SiC-coated porous silicon particles. Steps (b) and (c) may be performed simultaneously. In any of the foregoing embodiments, the carbon-containing precursor may comprise an unsaturated hydrocarbon, such as an aromatic alkyne, an aliphatic alkyne, an aromatic alkene, an aliphatic alkene, a polymer comprising at least one unsaturated carbon-carbon bond, or any combination thereof. In some embodiments, the carbon-containing precursor comprises pitch, phenylacetylene, acetylene, or any combination thereof.

In some embodiments, a method for making carbon-coated porous silicon particles combining porous silicon particles with pitch at a temperature $T_A$ less than 300° C. to provide a mixture of porous silicon particles and pitch; and heating the mixture under conditions effective to carbonize the pitch and form a continuous carbon coating on pore surfaces and outer surfaces of the porous silicon particles, thereby providing carbon-coated porous silicon particles.

In any of the foregoing embodiments, the method may further include forming an additional carbon coating by subsequently contacting the particles with a subsequent carbon-containing precursor, and subjecting the particles to conditions effective to decompose the subsequent carbon-containing precursor, thereby forming the additional carbon coating on at least a portion of an outer surface of the particles.

The foregoing and other objects, features, and advantages of the invention will become more apparent from the following detailed description, which proceeds with reference to the accompanying figures.

and a carbon/silicon carbide-coated porous silicon (C/SiC/P—Si) particle with a carbon coating that fills external pores (structure II).

Figures 2, 3:
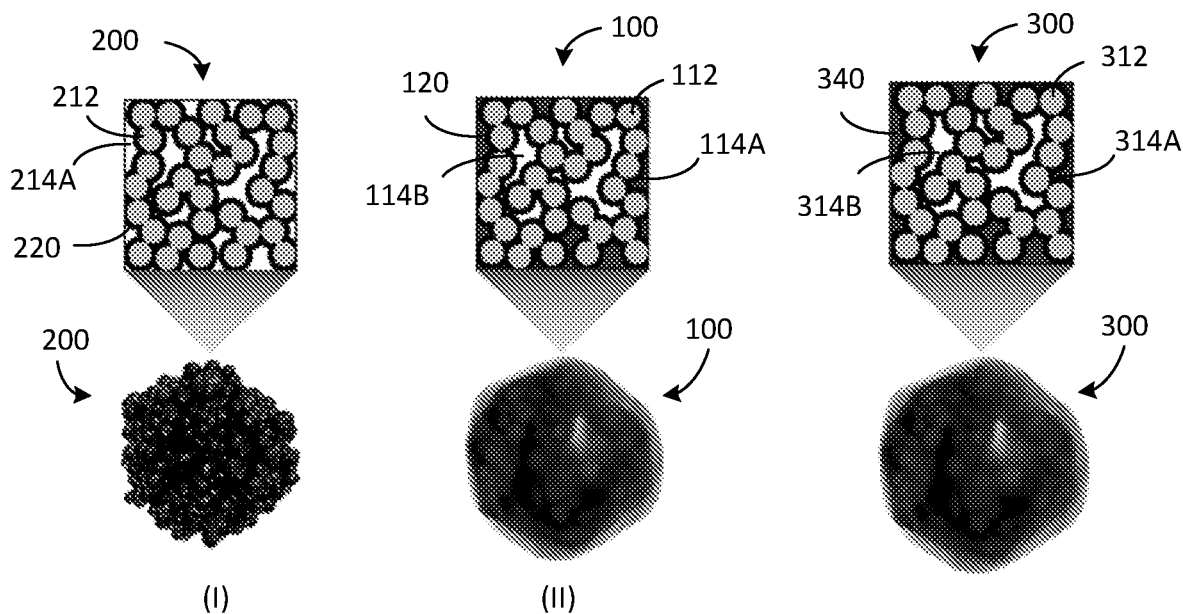
FIG. 2 shows representations of a carbon/silicon carbide-coated porous silicon (C/SiC/P—Si) particle with a carbon coating that preserves external pore structure (structure I)

FIG. 3 shows a representation of an exemplary carbon-coated porous silicon (C/P—Si) particle.

Figure 4:
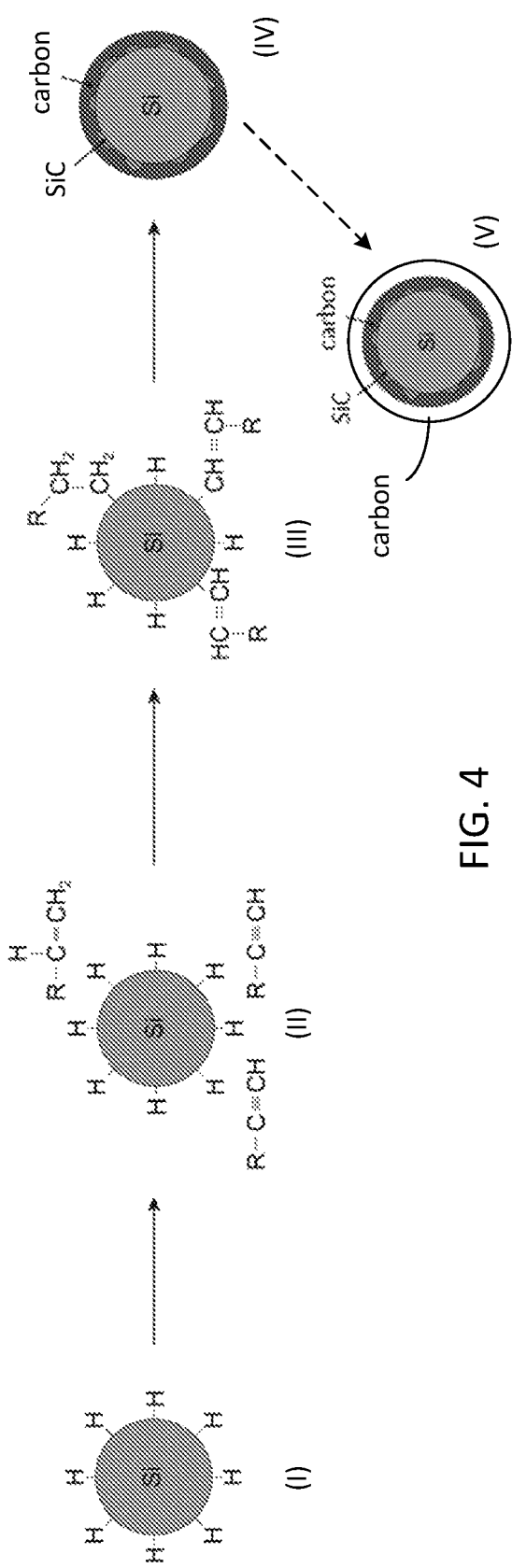

FIG. 4 is a reaction scheme showing one embodiment of a method for making a C/SiC/P—Si particle.

Figure 5:
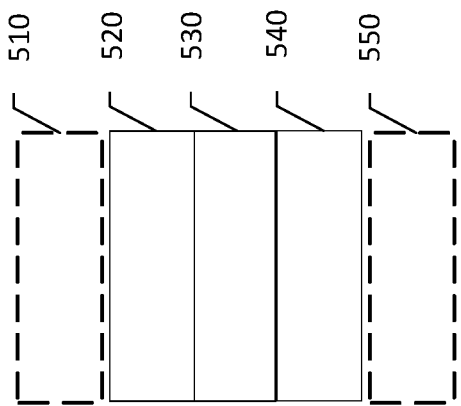

FIG. 5 is a schematic diagram of an exemplary lithium ion battery.

Figures 6A, 6B, 6C:
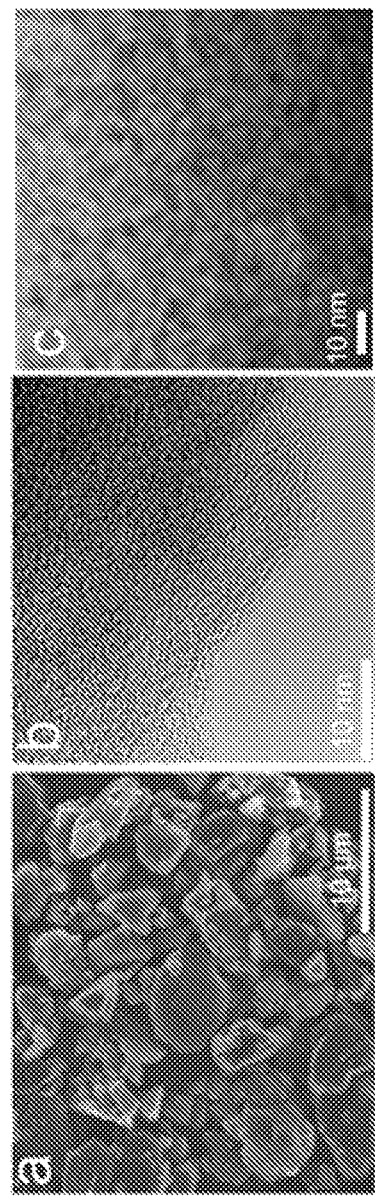

FIGS. 6A-6C show morphology and structure of C/P—Si produced by one embodiment of the disclosed method; FIG. 6A is a scanning electron microscope (SEM) image showing microparticles of C/P—Si; FIG. 6B is a transmission electron microscope (TEM) image showing a carbon layer with a thickness of 5-10 nm on the surface of the P—Si; FIG. 6C is a scanning TEM (STEM) image showing that the C/P—Si microparticles are composed of interconnected P—Si nanoparticles.

FIGS. 7A and 7B show the cycling stability of an anode comprising the C/P—Si of FIGS. 6A-6C in a coin cell with a Li counter electrode in several electrolytes; FIG. 7A shows capacity retention as a function of cycle number, and FIG. 7B shows the coulombic efficiency as a function of cycle number.

FIGS. 8A and 8B show the cycling stability of an anode comprising C/P—Si in a full cell with an NMC532 cathode as the counter electrode; FIG. 8A shows capacity retention as a function of cycle number, and FIG. 8B shows the coulombic efficiency as a function of cycle number.

Figure 9A:
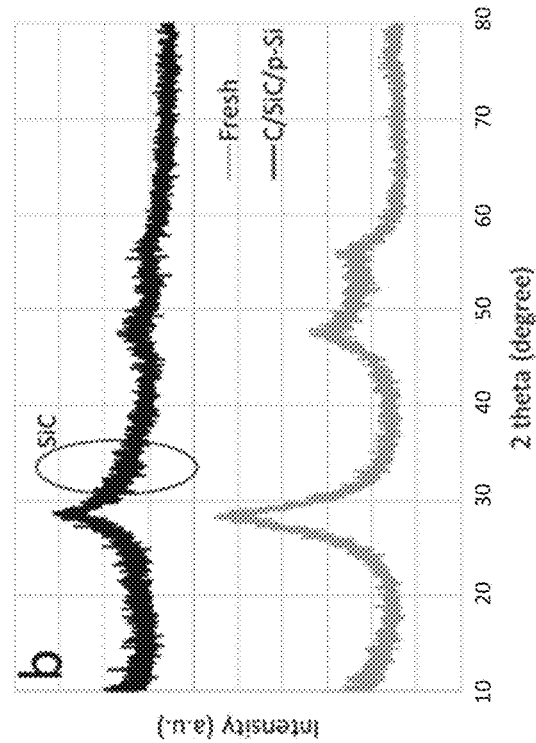
Figure 9B:
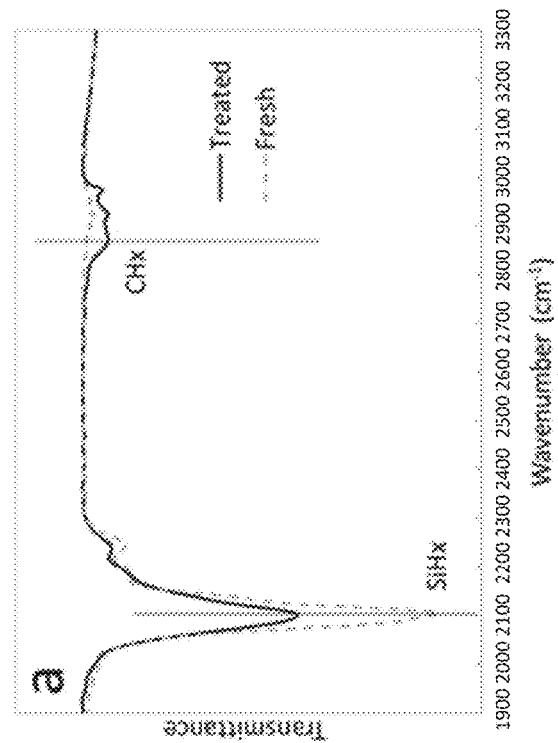

FIG. 9A shows IR spectra of porous silicon before and after phenylacetylene treatment. FIG. 9B shows XRD patterns of fresh porous silicon and C/SiC/P—Si after chemical vapor deposition and carbonization of acetylene.

Figure 10A:
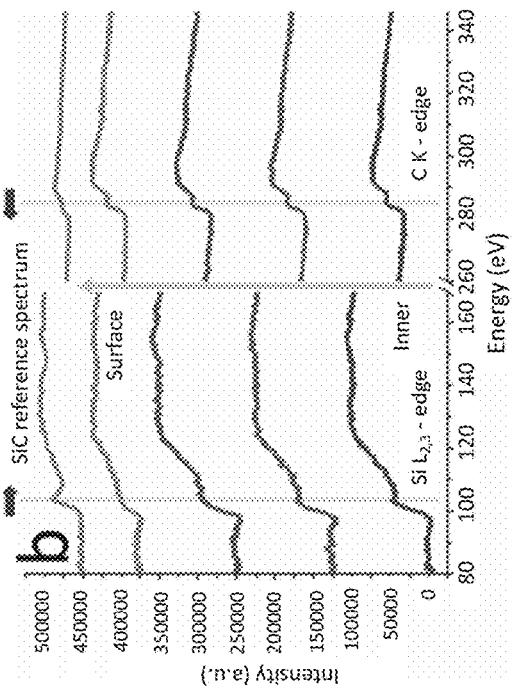
Figure 10B:
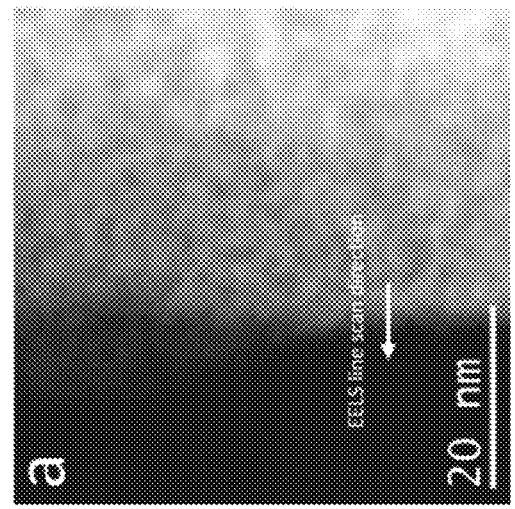

FIGS. 10A and 10B show the STEM image and electron energy loss spectroscopy (EELS) results of the C/SiC/P—Si of FIG. 9B. FIG. 10A shows the position at which the EELS line scan was captured, and FIG. 10B shows the results of the EELS line scan.

FIGS. 11A and 11B show the morphology and structure of the C/SiC/P—Si of FIG. 9B. FIG. 11A is a TEM image, and FIG. 11B is a STEM image.

FIGS. 12A and 12B show the cycling stability of an anode comprising the C/SiC/p-Si of FIGS. 9-11 in a coin cell with Li as the counter electrode and an electrolyte of 1.2 M $LiPF_6$ in EC-EMC (3:7 by wt.)+10 wt. % FEC; FIG. 12A shows capacity retention as a function of cycle number; FIG. 12B shows coulombic efficiency as a function of cycle number.

Figure 13A:
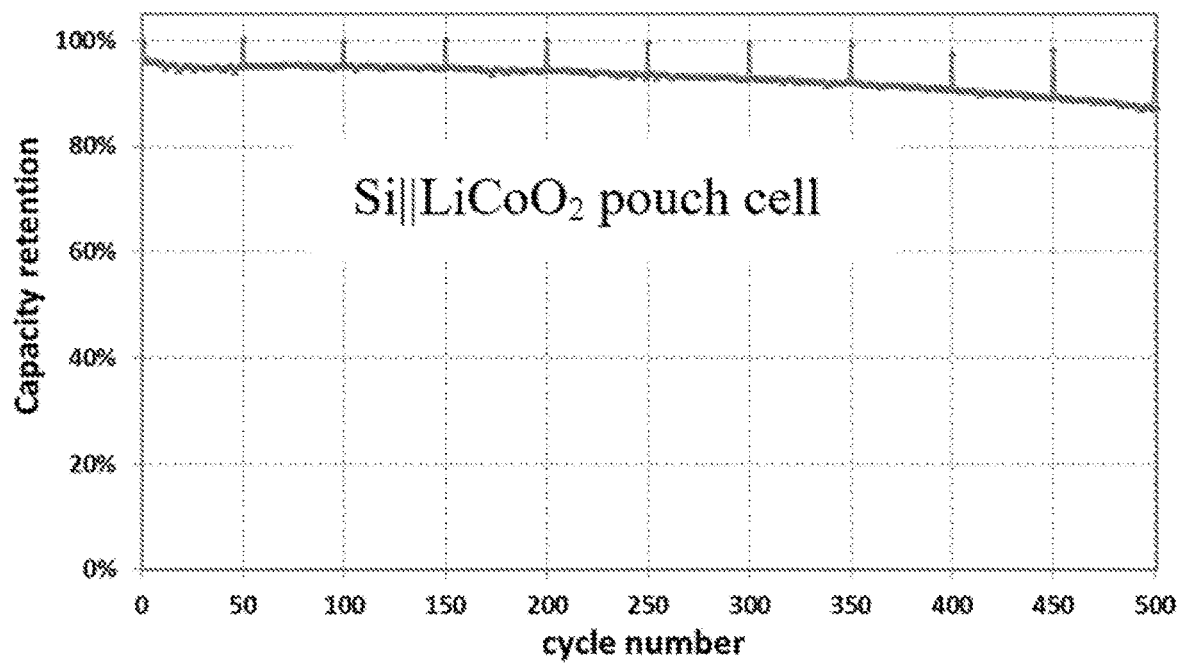
Figure 13B:
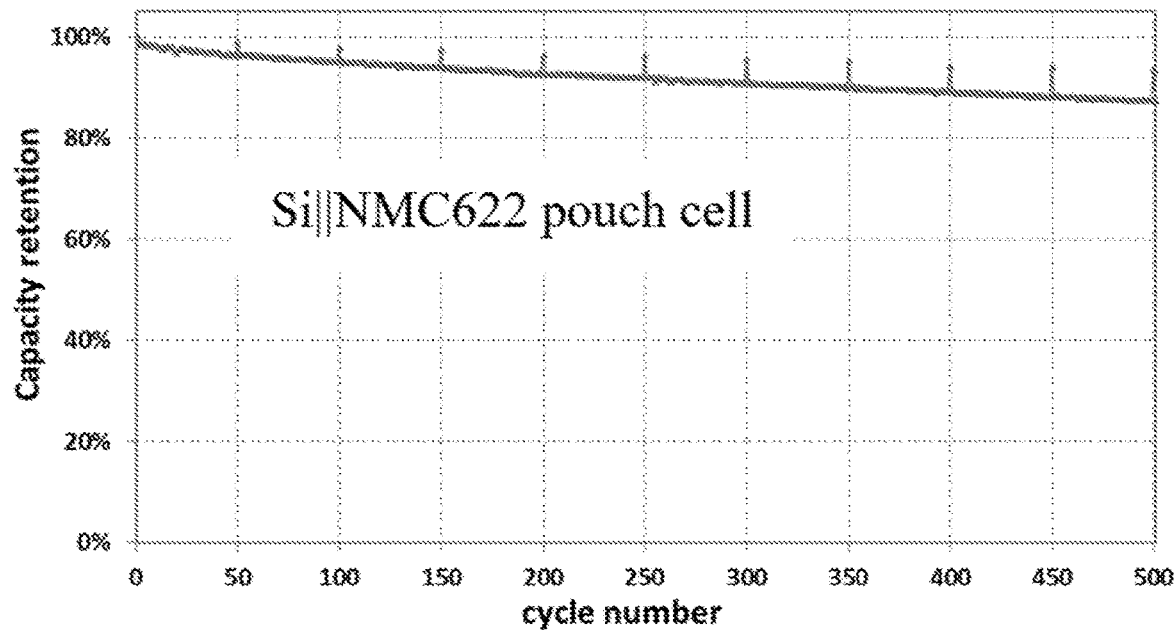

FIGS. 13A and 13B show the capacity retention as a function of cycle number of an anode comprising the C/SiC/p-Si of FIGS. 9-11 in single layer pouch cells using $LiCoO_2$ (13A) and $LiNi_{0.6}Mn_{0.2}Co_{0.2}O_2$ (13B) respectively as cathode and 1.2 M $LiPF_6$ in EC-PC-EMC (1:3:6 by wt)+1 wt % VC+7 wt % FEC as electrolyte.

DETAILED DESCRIPTION

This disclosure concerns embodiments of stabilized porous silicon particles, as well as methods for making the particles. The stabilized porous silicon particles may be used in anodes, such as anodes for lithium ion batteries. In some embodiments, the stabilized porous silicon particles are coated with a heterogeneous layer comprising a discontinuous silicon carbide (SiC) coating and a continuous carbon coating. In other embodiments, the stabilized porous silicon particles are coated with carbon.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 2016 (ISBN 978-1-118-13515-0).

In order to facilitate review of the various embodiments of the disclosure, the following explanations of specific terms are provided:

Active salt: As used herein, the term "active salt" refers to a salt that significantly participates in electrochemical processes of electrochemical devices. In the case of batteries, it refers to charge and discharge processes contributing to the energy conversions that ultimately enable the battery to deliver/store energy. As used herein, the term "active salt" refers to a salt that constitutes at least 5% of the redox-active materials participating in redox reactions during battery cycling after initial charging.

Aliphatic: A substantially hydrocarbon-based compound, including alkanes, alkenes, alkynes, including cyclic versions thereof, and further including straight- and branched-chain arrangements, and all stereo and position isomers as well.

Anode: An electrode through which electric charge flows into a polarized electrical device. From an electrochemical point of view, negatively-charged anions move toward the anode and/or positively-charged cations move away from it to balance the electrons leaving via external circuitry.

Aromatic or aryl: Unsaturated, cyclic hydrocarbons having alternate single and double bonds. Benzene, a 6-carbon ring containing three double bonds, is a typical aromatic compound. As used herein, the term arylaliphatic refers to an aromatic compound having an aromatic portion and an aliphatic portion. The term aromatic alkyne refers to an aromatic compound having an aromatic portion and an alkynyl substituent, e.g., phenylacetylene. The term aromatic alkene refers to an aromatic compound having an aromatic portion and an alkenyl substituent, e.g., styrene (ethenylbenzene). The term aromatic alkane refers to an aromatic compound having an aromatic portion and alkyl substituent, e.g., toluene.

Carbonize: Convert into carbon, typically by heating.

Cathode: An electrode through which electric charge flows out of a polarized electrical device. From an electrochemical point of view, positively charged cations invariably move toward the cathode and/or negatively charged anions move away from it to balance the electrons arriving from external circuitry.

Composite: A solid material composed of two or more constituent materials having different physical and/or chemical characteristics that, when combined, produce a material in which each substance retains its identity while contributing desirable properties to the whole. By "retains its identity" is meant that the individual materials remain separate and distinct within the composite structure. A composite is not a solid solution or a simple physical mixture of the constituent materials. In other words, each particle of the composite includes regions or domains of the two or more constituent materials.

Connected/Interconnected: As used herein with respect to silicon particles, the term "connected" means that a silicon particle is fused to at least one other adjacent silicon particle. The term "interconnected" means that a plurality of connected silicon particles forms a continuous structure.

Disproportionation/dismutation: A redox reaction in which a compound of intermediate oxidation state converts into one compound of higher oxidation state and one compound of lower oxidation state, e.g., SiO→SiO$_2$+Si.

Electrolyte: A substance containing free ions that behaves as an electrically conductive medium. Electrolytes generally comprise ions in a solution, but molten electrolytes and solid electrolytes also are known.

Infiltrate: As used herein, the term "infiltrate" means to cause a vapor or liquid to permeate a porous substance by penetrating its pores.

Microparticle: As used herein, the term "microparticle" refers to a particle with a size measured in microns, such as a particle with a diameter within a range of from 1-100 μm.

Nanoparticle: As used herein, the term "nanoparticle" particle that has a size measured in nanometers, such as a particle with a diameter within a range of from 1-100 nm.

Pitch: A black or dark viscous material obtained as a residue in the heating or distillation of organic materials, such as petroleum, coal tar, or plants. Pitch is a complex mixture of phenols, polycyclic aromatic hydrocarbons (PAHs; e.g., phenanthrene, acenaphthene, fluorene, anthracene, and the like), and heterocyclic compounds.

Polymer: A molecule of repeating structural units (e.g., monomers) formed via a chemical reaction, i.e., polymerization.

Pore: One of many openings or void spaces in a solid substance of any kind.

Porous: A term used to describe a material comprising a plurality of pores and that is permeable to fluids (such as liquids or gases).

Precursor: An intermediate compound. A precursor participates in a chemical reaction to form another compound. As used herein, the term "precursor" refers to a carbon-containing compound that participates in a reaction to form elemental carbon.

II. CARBON/SILICON CARBIDE-COATED AND CARBON-COATED POROUS SILICON PARTICLES

Silicon has been regarded as one of the most promising anode materials for next generation lithium-ion batteries (LIBs) with high energy density because it has 10 times higher theoretical specific capacity (4200 mAh/g) than that of graphite. However, severe volume change (~300-400%) of Si during lithiation and delithiation hinders the practical application of Si anode by 1) particle fracture and pulverization, 2) disintegration of the electrode, and 3) ceaseless electrolyte decomposition at the newly exposed surface. These phenomena cause rapid capacity loss and increased impedance, and shorten the cycle life of a Si anode and associated electrochemical devices such as lithium ion batteries (LIBs), which makes its practical application difficult.

In some instances, porous Si is used to provide spaces for Si expansion. However, the intrinsic properties of a porous structure pose several other disadvantages. The high surface area can offer a large number of sites for the formation of a solid electrolyte interphase (SEI) layer, causing low coulombic efficiency (CE). The large pore volume for Si expansion absorbs large amount of liquid electrolyte, which in turn decreases the energy density of LIBs and makes the electrode preparation difficult as more binder solvent is needed. Porous Si is relatively fragile compared to its solid counterpart, a key property required for electrode calendering. The weak mechanical strength of porous structure also makes it vulnerable to sintering when heated. Additionally, Si has low electrical conductivity due to its semiconductor nature, which limits its rate capability during fast charge/discharge.

Figure 1:
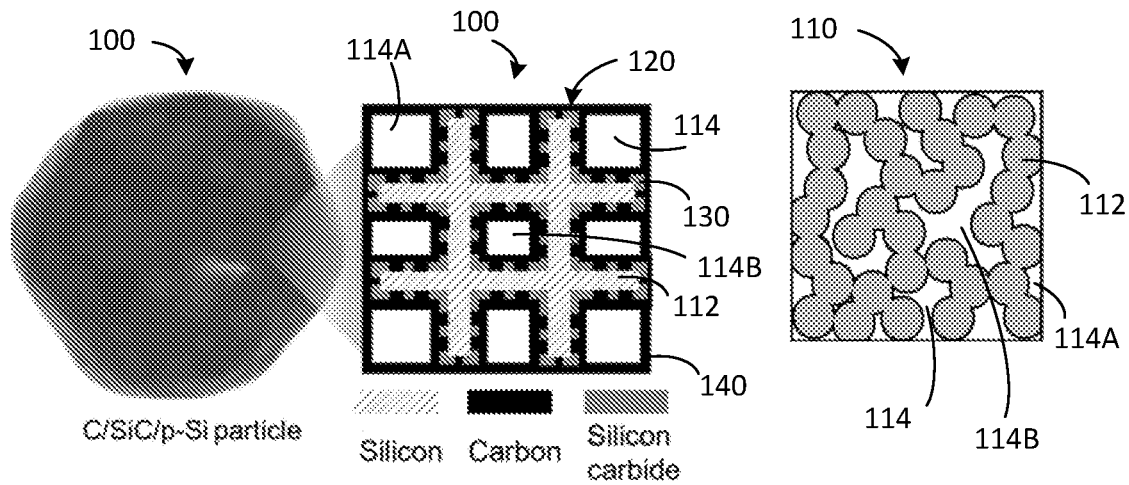
FIG. 1 shows a representation of an exemplary carbon/silicon carbide-coated porous silicon (C/SiC/P—Si) particle and stylized schematic diagrams of the particle.

Embodiments of carbon- and silicon carbide-coated porous silicon particles that address one or more of the foregoing problems when used in silicon-based anodes are disclosed. In some embodiments, e.g., as shown in FIG. 1, a carbon/SiC-coated porous silicon (C/SiC/P—Si) particle 100 comprises (i) a porous silicon particle 110 comprising a plurality of interconnected silicon nanoparticles 112, interconnected silicon nanoparticles being connected to at least one other silicon nanoparticle, and a plurality of pores 114 defined by the interconnected silicon nanoparticles 112, and (ii) a heterogeneous layer 120 comprising a discontinuous SiC coating 130 on at least a portion of pore surfaces and an outer surface of the porous silicon particle, and a continuous carbon coating 140 on an outer surface of the SiC coating and remaining portions of the pore surfaces and the outer surface of the porous silicon particle. Alternatively, the particles can be considered as porous silicon with a heterogeneous layer of discontinuous SiC and continuous carbon. By "interconnected silicon nanoparticles" is meant that each interconnected silicon nanoparticle 112 is fused, or bonded, to at least one other silicon nanoparticle, e.g., as shown in FIG. 1. By "discontinuous" is meant that the SiC coating is present in patches or regions that cover only portions of the pore surfaces and outer surface of the porous silicon particle. Thus, the SiC coating is discontinuous across surfaces of the porous silicon particle. By "continuous" is meant that the carbon coating coats all surfaces of the particle, including the SiC coating surface as well as surfaces of the particle that are not coated with SiC. The pores 114 include surface pores 114a and internal pores 114b.

In some embodiments, all of the silicon nanoparticles in the C/SiC/P—Si particle are interconnected. In an independent embodiment, the C/SiC/P—Si particle further comprises at least some Si nanoparticles that are not interconnected. For instance, the proportion of unconnected, or free, Si nanoparticles in the C/SiC/P—Si particle may be up to 0.5%, up to 1%, up to 5%, or even up to 10% of the silicon nanoparticles, such as from 0-10%, 0.01-10%, 0.01-5%, 0.05-5%, 0.05-1%, or 0.05-0.5%.

In any of the foregoing embodiments, the silicon nanoparticles 112 may have an average diameter within a range of from 1-20 nm, such as from 1-10 nm, 1-5 nm, or 3-5 nm. In any of the foregoing embodiments, the C/SiC/P—Si particles may be microparticles. In some embodiments, the C/SiC/P—Si microparticles have an average size within a range of from 1-20 µm, such as from 1-10 µm.

In any of the foregoing embodiments, an average thickness of the heterogeneous layer 120 comprising the discontinuous SiC coating 130 and the continuous carbon coating 140 may be within a range of from 1 nm to 20 nm. In some embodiments, the combined average thickness of the SiC and carbon coatings is from 1-10 nm, 2-5 nm or 2-3 nm.

Embodiments of the disclosed C/SiC/P—Si particles include a discontinuous SiC coating 130 that extends across portions of the pore surfaces and outer surface of the porous silicon particle. In any of the foregoing embodiments, from 20 to 90%, such as from 20-70% or 25-50%, of the porous silicon surface area (inclusive of pore surface area) may be covered with the discontinuous SiC coating. The extent of SiC coverage can be determined by any suitable means, such as by Infrared spectra, Raman spectra, transmission electron microscopy (TEM) or scanning transmission electron microscopy (STEM) and associated electron energy loss spectroscopy (EELS). In any of the foregoing embodiments, the discontinuous SiC coating 130 may have a thickness of less than 1 nm. In some embodiments, the discontinuous SiC coating has a thickness within a range of from 0.2-0.95 nm or from 0.2-0.5 nm. SiC has a high impedance compared to Si and is largely inactive to lithium storage. Therefore, a full coverage of SiC on porous Si will lead to a decrease in the conductivity and increase in the impedance of Si particles. In the structure disclosed herein, the discontinuity of the SiC layer and subsequent carbon coating provide a direct path for electron transfer without going through the SiC layer, thereby ensuring electrical conductivity with minimal or no impact on impedance. This structure also provides mechanical strength and preserving porosity of the underlying silicon particle. Advantageously, the SiC coating also reduces chemical and electrochemical reactions between silicon and electrolytes when the C/SiC/P—Si particles are used in anodes for lithium ion batteries The continuous carbon coating 140 covers all surfaces of the porous silicon particle, including outer surfaces of the SiC coating and all silicon surfaces not coated with SiC, including internal and external pore surfaces and the particle's outer surface. In any of the foregoing embodiments, the continuous carbon coating 140 of the heterogeneous layer 120 may be a conformal coating that preserves the overall shape of the underlying porous silicon particle. In some embodiments, the continuous carbon coating 140 extends across and seals outwardly opening surface pores 114A on the porous silicon particle 110, thereby providing an outer nonporous carbon coating as shown in FIG. 1 and particle 100 of FIG. 2; for ease of illustration, regions of SiC are not shown in the heterogeneous layer 120 of FIG. 2. In some embodiments, the surface pores 114A are completely filled. The carbon coating 130 covers surface of internal pores 114B of the SiC/P—Si, but does not fill the internal pores, thereby retaining internal porosity. In some embodiments, the coated internal pores have an average volume within a range of from 5-95% of the average volume of the internal pores prior to coating, and/or an average diameter within a range of from 5-95% of the average diameter of the internal pores prior to coating. This structure is in contrast to a C/SiC/P—Si or C/P—Si particle comprising a carbon or C/SiC coating 220 that coats surfaces of a P—Si particle comprising interconnected silicon nanoparticles 212, but does not fill and seal the external pores 214A (structure I of FIG. 2). In some embodiments, a thickness of the carbon coating on an outer surface of the C/SiC/P—Si particle 100 is within a range of from 1-20 nm, such as from 1-10 nm, 1-5 nm, or 1-3 nm. In some embodiments, the carbon coating increases mechanical strength of the C/SiC/P—Si particle, enhances electrical conductivity of the C/SiC/P—Si particle, and/or reduces side reactions with electrolytes. In any of the foregoing embodiments, the C/SiC/P—Si particles may have a carbon content within a range of from 30-60 wt %, such as from 30-50 wt % carbon.

Advantageously, the internal porous structure provides void space to accommodate volume changes of the silicon during lithiation/delithiation when used in a lithium ion battery, thereby retaining structural integrity and minimizing cracking during charge/discharge processes. The sealed outer surface blocks penetration of electrolyte into the inner pores and/or limits formation of a solid electrolyte interphase (SEI) layer to the outer surface only. In some embodiments, the carbon coating fills outer pores 114A of the P—Si particle 100 as shown in FIG. 1 and in structure II of FIG. 2, thereby further reducing the outer surface area and the number of sites for SEI layer formation. In certain embodiments, C/SiC/P—Si particle with filled outer pores provides a greater coulombic efficiency (CE) when the C/SiC/P—Si particles are used in anodes as compared to the CE provided by C/SiC/P—Si or C/P—Si particles without filled outer pores. The discontinuous SiC coating provides mechanical strength and also reduces chemical and electrochemical reactions between the silicon and an electrolyte. The carbon coating, especially portions of the carbon coating directly in contact with the regions of Si not covered by high impedance SiC, forms an electrically conductive network throughout the C/SiC/P—Si particle. Synergistically, then, the heterogeneous layer comprising the discontinuous SiC coating and the continuous carbon coating provides a highly stable porous Si with protection from electrolyte reactions and high utilization of Si during charge/discharge processes.

In some embodiments, e.g., as shown in FIG. 3, a carbon-coated porous silicon (C/P—Si) particle 300 comprises a porous silicon particle comprising a plurality of interconnected silicon nanoparticles 312, each interconnected silicon nanoparticle connected to at least one other silicon nanoparticle. The plurality of interconnected silicon nanoparticles 312 defines a plurality of external pores 314A and internal pores 314B. The particle 300 further comprises a continuous carbon coating 340 on an outer surface of the particle and as well as on surfaces of the internal pores 314B. The carbon coating 340 may preserve the overall shape of the underlying porous silicon particle. In some embodiments, the continuous carbon coating 340 extends across and seals outwardly opening surface pores 314A, thereby providing an outer nonporous carbon coating as shown in FIG. 3. In certain embodiments, the carbon coating has an average thickness within a range of from 2-10 nm. In any of the foregoing embodiments, the C/P—Si particles may have a carbon content within a range of from 30-60 wt %, such as from 30-50 wt % carbon.

III. METHODS OF MAKING CARBON/SIC-COATED AND CARBON-COATED POROUS SILICON PARTICLES

Porous silicon may be coated with carbon to stabilize the porous structure and/or increase overall conductivity relative to pure silicon. Although porous silicon can be coated with carbon using chemical vapor deposition (see, e.g., U.S. Pat. No. 9,269,949) to thinly coat the inner pores and form a conductive coating connecting the primary Si particles, the intrinsic large surface area of porous Si makes it vulnerable to sintering upon heating, resulting in loss of porosity and the intended porous structure of the final Si—C composite. Sintering of porous Si promotes growth of Si crystallites, which are well known to cause unstable battery cycling performance due to stress generated by the phase change between $Li_{15}Si_4$ and Si during battery charging/discharging. There is a need for more effective methods to stabilize the porous structure and maintain porosity when preparing porous silicon-carbon (C/SiC/P—Si) composite anodes for use in large-scale applications such as electrical vehicles and grid energy storage.

This disclosure concerns embodiments of methods for forming more stable C/SiC/P—Si and C/P—Si composites. Porous silicon, P—Si, may be obtained or produced by any suitable method. In one method, porous silicon is obtained by high-temperature (800-1150° C.) disproportionation reaction to form a composite of $SiO_2$ and Si with nano-sized domains. HF etching may be used to remove $SiO_2$, leaving P—Si with H-terminated surfaces (FIG. 4, structure I). In an independent method, P—Si is obtained by hydrolysis of a silane, such as triethoxysilane, to provide a $SiO_{1.5}$ precursor (e.g., silsesquioxane), which is subsequently calcined and treated with HF to provide P—Si with H-terminated surfaces. In another independent method, P—Si with H-terminated surfaces is obtained by electrochemical etching of boron-doped crystalline Si using an electrolyte comprising 48% HF/ethanol (3:1). In any of the foregoing embodiments, the resulting porous silicon may be a microparticle comprising a plurality of interconnected silicon nanoparticles, each interconnected silicon nanoparticle connected to at least one other silicon nanoparticle, and a plurality of pores defined by the interconnected silicon nanoparticles (e.g., as previously described and shown in FIGS. 1-3).

In any of the foregoing or following embodiments, the resulting C/SiC/P—Si or C/P—Si particles also may be microparticles. In some embodiments, the initial P—Si nanoparticles have an average size within a range of from 1-20 nm, such as from 1-10 nm, 1-5 nm, or 3-5 nm. The P—Si microparticles comprise a plurality of interconnected P—Si nanoparticles, and may have an average size within a range of from 1-20 µm, such as from 1-10 µm. Inner pore surfaces of the C/SiC/P—Si microparticles are C/Si coated and inner pore surfaces of the C/P—Si microparticles are carbon-coated. In some embodiments, the microparticles comprise an outer heterogeneous C/SiC layer or a carbon layer having an average thickness within a range of from 1-20 nm, such as from 1-10 nm, 1-5 nm, 2-5 nm, or 2-3 nm. Advantageously, the P—Si nanoparticles within the resulting C/SiC/P—Si or C/P—Si microparticles have a size substantially similar (e.g., ±20%) to that of the initial P—Si nanoparticles, indicating minimal or no sintering of the Si. Accordingly, the resulting C/SiC/P—Si or C/P—Si may have an average size within a range of from 1-20 µm, such as from 1-10 µm. In any of the foregoing or following embodiments, the C/SiC/P—Si or C/P—Si microparticles may have a carbon content within a range of from 30-60 wt % carbon, such as from 30-50 wt % carbon.

A. Carbon/SiC-Coated Porous Silicon Particles

In some embodiments, a method for forming C/SiC/P—Si particles includes coating surfaces of porous silicon 110, including surfaces of inner pores 114A, with a heterogeneous layer 120 comprising discontinuous SiC 130 and continuous carbon 140 (FIG. 1). As shown in the stylized diagram of FIG. 1, the inner pores 114A of porous Si 110 are coated with a sub-nanometer discontinuous SiC coating 130 and a thin continuous layer of carbon 140, and the overall inner porous structure remains. This increases the overall conductivity of the composite by forming a conductive coating connecting all primary Si particles without passing through the regions of high impedance SiC coating. Also, the void space can accommodate the volume change of Si. In some embodiments, the outer pores are fully covered with carbon (FIG. 1; structure II of FIG. 2), blocking penetration of binder solution and electrolyte into the otherwise highly porous inner structure with high surface area. In certain embodiments, the method further includes forming a second carbon coating over at least a portion of the outer surfaces of the porous silicon (structure V, FIG. 4). Overall the C/SiC/P—Si composite has micro-sized secondary particles with high tap density. The interconnected carbon coating throughout the composite also improves its mechanical strength, making high pressure electrode calendering viable.

Embodiments of the disclosed method for making C/SiC/P—Si include providing P—Si having H-terminated surface Si atoms (FIG. 4, structure I), and combining the P—Si particles with carbon-containing precursor molecules to provide a mixture of the P—Si particles and carbon-containing precursor molecules, wherein the carbon-containing precursor molecules surround outer surfaces of the P—Si particles and are infiltrated into pores of the P—Si particles (FIG. 4, structure II). For ease of illustration, pores are not expressly shown in FIG. 4, but are present. Although carbon-containing precursor molecules are closely associated with, or in close proximity to, surfaces of the P—Si particles, including the outer surface and pore surfaces, the precursor molecules are not bound to Si atoms. The carbon-containing precursor may be a liquid, a gas, or a vapor. In some embodiments, the process is performed at a temperature $T_1$ where $T_1$ is insufficient to break Si—H bonds of the surface Si atoms and bind the carbon-containing precursor molecules to the Si atoms, and is also insufficient to carbonize the carbon-containing precursor molecules. Thus, intact carbon-containing precursor molecules surround the P—Si particle and are infiltrated into pores of the P—Si particle, but are not chemically bonded to the particle. In some embodiments, the temperature $T_1$ is <300° C., such as ≤250° C., ≤200° C., ≤150° C., ≤100° C., or even ≤50° C. The temperature $T_1$ may be within a range of from ambient temperature (e.g., 20-25° C.) to 275° C., such as from 20-250° C., 20-200° C., 20-150° C., 20-100° C., or 20-50° C. In certain embodiments, the temperature $T_1$ is ambient temperature, e.g., 20-30° C. or 20-25° C. In some embodiments, the combining process is performed under a vacuum or partial vacuum to facilitate penetration of the carbon-containing precursor molecules into interior pores of the P—Si.

In any of the foregoing embodiments the carbon-containing precursor may be a carbon-containing precursor including at least one unsaturated bond. In the exemplary scheme shown in FIG. 4, the carbon-containing precursor has a formula R—CH=$CH_2$, where R is aliphatic or aromatic. However, the carbon-containing precursor is not limited to molecules including double bonds. In some embodiments, the carbon-containing precursor is a hydrocarbon, such as an unsaturated hydrocarbon. The hydrocarbon chain may be branched, straight, or cyclic. Suitable hydrocarbons include, but are not limited to, unsaturated aliphatic and arylaliphatic compounds, such as aromatic alkynes, aliphatic alkynes, aromatic alkenes, aliphatic alkenes, unsaturated polymers, or any combination thereof. In certain embodiments, the hydrocarbon comprises pitch, phenylacetylene, acetylene, or any combination thereof.

In any of the foregoing embodiments, combining the porous Si particles with the carbon-containing precursor may be performed using a wet chemical process or a gaseous treatment process. In some embodiments, a wet chemical process comprises infiltrating a liquid phase comprising a carbon-containing precursor into the porous Si particles, thereby penetrating the inner pores with the carbon-containing precursors and surrounding outer surfaces of the particles with the liquid phase. In a wet chemical process, infiltration is performed at temperature <300° C. and preferably at a temperature below a boiling point of the liquid phase. In some embodiments, infiltration is performed without intentional heating, such as at room temperature (e.g., 20-25° C.). In certain embodiments, infiltration is performed under vacuum to facilitate penetration into inner pores of the Si particles. Vacuum infiltration may be particularly useful when the carbon-containing precursor has a large molecular weight, such as when the carbon-containing precursor comprises a polymer (e.g., pitch). In some examples, infiltration may be performed by mechanically mixing the porous Si particles and the liquid phase comprising the carbon-containing precursor. In some embodiments, the liquid phase consists essentially of or consists of the carbon-containing precursor. By "consists essentially of" is meant that the liquid phase comprises at least 95 wt % carbon-containing precursor. In certain embodiments, the liquid phase comprises the carbon-containing precursor and a solvent. Suitable solvents include organic solvents that solubilize the carbon-containing precursor and vaporize at temperatures below 400° C., such as at a temperature greater than 25° C. and less than 400° C. Advantageously, the solvent is vaporizable at a temperature below a temperature at which the carbon-containing precursor decomposes. The amount of solvent is sufficient to form a flowable liquid with the carbon-containing precursor. In some embodiments, the carbon-containing precursor is pitch and the liquid phase comprises from 5-30 wt % pitch and 70-95 wt % solvent, such as from 10-15 wt % pitch and 85-90 wt % solvent. After infiltration, the solvent may be evaporated prior to further processing, leaving the carbon-containing precursor on, but not bound to, surfaces of the Si particles.

In some embodiments, a gaseous treatment process is used to combine the porous Si particles with the carbon-containing precursor. Gaseous treatment process may be effective when the carbon-containing precursor can be vaporized at a temperature below 300° C. Gaseous treatment is performed at a temperature $T_1$ as defined above. In some embodiments, gaseous treatment is performed at a temperature that is insufficient to initiate binding of the carbon-containing precursor to the Si surface.

Embodiments of the disclosed method for making C/SiC/P—Si further include a pretreatment process that comprises heating the mixture of porous silicon particles and carbon-containing precursor molecules under conditions effective to break H—Si bonds of a portion of the H-terminated surface Si atoms to provide non-H-terminated surface Si atoms and form bonds between the non-H-terminated surface Si atoms and carbon atoms of a portion of the carbon-containing precursor molecules to form intermediate porous silicon particles comprising Si-carbon-containing precursor moieties and unreacted carbon-containing precursor molecules surrounding the porous silicon particles and infiltrated into the pores (FIG. 4, structure III). The effective conditions include temperature and time, and depend at least in part on the identity of the carbon-containing precursor. In some embodiments, the effective conditions include a temperature $T_2$ within a range of 120-350° C., such as a temperature of 120-300° C. or 150-250° C., and a time $t_1$ within a range of 10 minutes to 10 hours. In certain embodiments, the temperature $T_2$ is 200-250° C. and the time $t_1$ is 30-90 minutes. The temperature $T_2$ and time $t_1$ provide sufficient thermal energy to break some of the H—Si bonds on the P—Si particle surface to provide non-H-terminated surface Si atoms and form bonds between the non-H-terminated surface Si atoms and carbon atoms of some of the carbon-containing precursor molecules, thereby forming intermediate particles. While the Si atoms bind to one valence bond of certain carbon atoms in the carbon-containing precursor molecule, other valence bonds of the carbon atoms remain intact as shown in structure III of FIG. 4 because the temperature $T_2$ and time $t_1$ are insufficient to break the remaining bonds of the carbon atoms. The intermediate particles comprise Si-carbon-containing precursor moieties and are coated with unreacted carbon-containing precursor molecules. Advantageously, the pretreatment process passivates the Si surface of the intermediate particles and reduces subsequent sintering at high temperatures. The pretreatment conditions are insufficient to form SiC or carbonize the unreacted carbon-containing precursor molecules.

In some embodiments, the carbon-containing precursor, temperature $T_2$, and time $t_1$ of the pretreatment process are selected to that only a desired portion of Si atoms on the surface of the P—Si particle are bonded to the carbon-containing precursor molecules to form Si-carbon-containing precursor bonds. Other Si atoms on the P—Si particle surface remain H-terminated as shown in structure III of FIG. 4. In any of the foregoing embodiments, at least 20% of the surface Si atoms, including outer surface Si atoms and pore surface Si atoms, are bonded to the carbon containing precursor molecules such as at least 30%, at least 50%, at least 75%, at least 80%, or at least 90% of the surface Si atoms. However, less than 100% of the surface Si atoms are bonded to the carbon-containing precursor molecules. In some embodiments, from 20-90%, 30-90%, or 50-90% of the surface Si atoms are bonded to the carbon-containing precursor molecules. For example, when $t_1$ is one hour, a temperature $T_2$ of 120° C. may result in approximately 20% of the surface having Si—C bonds, a temperature $T_2$ of 220°

C. may result in approximately 30% of the surface having Si—C bonds, and a temperature $T_2$ of 350° C. may result in approximately 70% of the surface having Si—C bonds.

In any of the foregoing embodiments, the steps of combining the porous silicon particles with the carbon-containing precursor molecules and heating the mixture of porous silicon particles and carbon-containing precursor molecules under conditions effective to form bonds between some of the surface Si atoms and carbon atoms may be performed simultaneously. In some embodiments, the steps are performed simultaneously at the temperature $T_2$ and the time wherein the temperature $T_2$ is within a range of 120-300° C.

The intermediate particles are subsequently heated under conditions effective to form SiC from the Si-carbon-containing precursor moieties and carbonize the remaining unreacted carbon-containing precursor molecules, to form particles comprising a porous silicon particle and a heterogeneous layer comprising a discontinuous SiC coating on at least a portion of pore surfaces and an outer surface of the porous silicon particle, and a continuous carbon coating on an outer surface of the SiC coating, uncoated portions of the pore surfaces, and uncoated portions of the outer surface of the porous silicon particle, thereby forming C/SiC/P—Si particles (structure IV of FIG. 4). In some embodiments the effective conditions include a temperature $T_3 \geq 400°$ C. and a time $t_2 \geq 5$ minutes. In certain embodiments, the conditions comprise (i) a temperature $T_3$ within a range of 400-1000° C., such as 400-900° C., 600-800° C., or 650-750° C., (ii) a time $t_2$ within a range of a range of 5 minutes to 5 hours, such as 5 minutes to 4 hours, 5 minutes to 3 hours, 30 minutes to 3 hours, or 1-3 hours, or (iii) both. In any of the foregoing embodiments, the process may be performed under an inert atmosphere, e.g., argon. In this high-temperature process, two reactions occur. For the Si-carbon containing precursor moieties with pre-formed Si—C bonds, bonds between the carbon atom of the Si—C bond and other parts of the carbon precursor are broken to form SiC on the P—Si particle surface. This reaction occurs at temperatures much lower than those required to form SiC in conventional processes. The remaining unreacted carbon-containing precursor molecules are decomposed to form a carbon coating that covers the SiC and uncoated portions of the P—Si surface, including uncoated portions of the pore surfaces and outer surface to form C/SiC/P—Si particles as shown in structure IV of FIG. 4. In some embodiments, the carbon coating is a continuous coating that fills and seals external pores of the porous silicon particle.

In any of the foregoing embodiments, the discontinuous SiC coating may have an average thickness of less than 1 nm. Although very thin, the SiC formed on portions of the P—Si passivates the Si surface and minimizes sintering of the Si nanostructure during the subsequent high-temperature carbon coating process. Meanwhile the carbon in contact with portions of the Si surface not coated with SiC forms an electrically conductive network connecting all Si nanoparticles throughout the coated porous Si particle. The heterogeneous layer comprising the discontinuous SiC coating and the continuous carbon coating synergistically enables formation of a highly stable porous Si with protection from electrolyte reactions and high utilization of Si during charge/discharge processes.

In any of the foregoing embodiments, the method of making C/SiC/P—Si may further include forming an additional carbon coating on at least a portion of an outer surface of the C/SiC/P—Si particles. In some embodiments, the additional carbon coating is provided on at least 50%, at least 75%, at least 80%, or at least 90% of the outer surface.

In some embodiments, the additional carbon coating is provided on 50-100%, 75-100%, 75-95%, or 75-90% of the outer surface. The additional outer carbon coating may aid in blocking surface pores, thereby reducing or eliminating electrolyte penetration into the C/SiC/P—Si composite when an anode comprising the C/SiC/P—Si composite is used in a battery. In some embodiments, the additional carbon coating is formed by subsequently contacting the C/SiC-coated porous silicon particles with a subsequent carbon-containing precursor and subjecting the C/SiC-coated porous silicon particles to conditions effective to decompose the subsequent carbon-containing precursor, thereby forming the additional carbon coating on at least a portion of an outer surface of the C/SiC-coated porous silicon particles. This optional process forms C/SiC/P—Si particles with a thicker carbon coating, e.g., as shown in structure V of FIG. 4. In some embodiments, the conditions effective to decompose the subsequent carbon-containing precursor include a temperature $T_4 > 400°$ C. and time $t_3 \geq 5$ minutes. In certain embodiments, the temperature $T_4$ is within a range of 600-800° C., such as 650-750° C., and/or the time $t_3$ is within a range of 5 minutes to 3 hours, such as 5-60 minutes or 10-30 minutes. The subsequent carbon-containing precursor may be a hydrocarbon, such as a saturated or unsaturated hydrocarbon. Suitable carbon-containing precursors include, but are not limited to, aliphatic and arylaliphatic compounds, such as aromatic alkynes, aliphatic alkynes, aromatic alkenes, aliphatic alkenes, aromatic alkanes, alkanes, and polymers. In some embodiments, the subsequent carbon-containing precursor comprises a hydrocarbon vapor, such as acetylene, phenylacetylene, ethylene, or methane. In certain embodiments, the subsequent carbon-containing precursor comprises pitch.

In one exemplary embodiment, the carbon-containing precursor is phenylacetylene and is infiltrated into the porous silicon at a temperature of 200-250° C. for a time of 30-90 minutes to bind phenylacetylene to the Si surface. A portion of the Si atoms on the surface of the P—Si particle are bonded to the carbon-containing precursor molecules to form Si-carbon-containing precursor bonds. The intermediate particles are subsequently heated at 650-750° C. for 5-60 minutes. The Si-carbon-containing precursor moieties bound to P—Si particles will form SiC under these conditions, and the remaining unreacted carbon-containing precursor molecules will be carbonized. As a result, C/SiC/P—Si particles will be formed with a heterogeneous layer comprising a discontinuous SiC coating on at least a portion of pore surfaces and an outer surface of the porous silicon particle, and a continuous carbon coating on an outer surface of the SiC coating, uncoated portions of the pore surfaces, and uncoated portions of the outer surface of the porous silicon particle. An additional carbon coating may be provided by performing the carbonization in an acetylene atmosphere.

In another exemplary embodiment, the carbon-containing precursor is phenylacetylene and is infiltrated into the porous silicon at a temperature of 200-250° C. for a time of 30-90 minutes to bind phenylacetylene to the Si surface. An additional carbon coating is provided by mixing the phenylacetylene-silicon with pitch followed carbonization under an inert atmosphere at 650-750° C. for 1-3 hours.

In yet another exemplary embodiment, the carbon-containing precursor is phenylacetylene and is infiltrated into the porous silicon at a temperature of 200-250° C. for a time of 30-90 minutes to bind phenylacetylene to the Si surface. An additional carbon coating is provided by mixing the phenylacetylene-silicon with pitch followed carbonization at 650-750° C. for 1-3 hours. Another additional carbon coating is provided by heating the C/SiC/P—Si in an acetylene atmosphere at 650-750° C. for 10-60 minutes.

In still another exemplary embodiment, the carbon-containing precursor is phenylacetylene and is infiltrated into the porous silicon at a temperature of 200-250° C. for a time of 30-90 minutes to bind phenylacetylene to the Si surface. Additional carbon coating is performed by infiltrating a solution of pitch into the porous silicon under vacuum, evaporating the solvent, and then carbonizing the pitch- and phenylacetylene-coated P—Si under an inert atmosphere at 650-750° C. for 1-3 hours.

In yet another exemplary embodiment, the carbon-containing precursor is acetylene and is infiltrated into the porous silicon at a temperature of 200-250° C. for a time of 30-90 minutes to bind acetylene to the Si surface. Additional carbon coating is provided by mixing the acetylene-coated silicon with pitch followed by carbonization under an inert atmosphere at 650-750° C. for 1-3 hours.

In still another exemplary embodiment, the carbon-containing precursor is acetylene and is infiltrated into the porous silicon at a temperature of 200-250° C. for a time of 30-90 minutes to bind acetylene to the Si surface. Additional carbon coating is provided by infiltrating a solution of pitch into the porous silicon under vacuum, evaporating the solvent, and then carbonizing the pitch- and acetylene-coated P—Si under an inert atmosphere at 650-750° C. for 1-3 hours.

B. Carbon-Coated Porous Silicon Particles

Embodiments of a method for making carbon-coated porous silicon (C/P—Si) particles include combining porous silicon particles with pitch, a carbon-containing precursor, at a temperature $T_A$ less than 300° C. to provide a mixture of porous silicon particles and pitch, wherein pitch surrounds outer surfaces of the porous silicon particles and is infiltrated into pores of the porous silicon particles. In some embodiments, the P—Si includes H-terminated surfaces as previously described. Generally, a slurry or solution comprising the pitch and a solvent is used. In some embodiments, the slurry or solution comprises from 5-30 wt % pitch and 70-95 wt % solvent, such as from 10-15 wt % pitch and 85-90 wt % solvent. In certain embodiments, the solvent is an aprotic solvent, such as toluene or tetrahydrofuran.

In any of the foregoing embodiments, the temperature $T_A$ may be within a range of from ambient temperature (e.g., 20-25° C.) to 200° C., such as from 20-200° C., 20-150° C., 20-100° C., or 20-25° C. The temperature $T_A$ is insufficient to form SiC or carbonize the pitch. In some embodiments, the process is performed under a vacuum or partial vacuum to facilitate penetration of the pitch into interior pores of the P—Si.

In any of the foregoing embodiments, the method for making C/P—Si further includes heating the mixture of porous silicon particles and pitch at a temperature $T_B \geq 400°$ C. and a time $t \geq 10$ minutes to carbonize the pitch and form a continuous carbon coating on the porous silicon particles, thereby providing carbon-coated porous silicon particles. In some embodiments, the effective conditions include a temperature $T_B \geq 400°$ C., and a time $t \geq 10$ minutes. In certain embodiments, the conditions comprise (i) a temperature $T_B$ within a range of 400-1000° C., such as 400-900° C., 600-800° C., or 650-750° C., (ii) a time t within a range of 5 minutes to 5 hours, such as 5 minutes to 4 hours, 10 minutes to 3 hours, or 1-3 hours, or (iii) both. In any of the foregoing embodiments, the process may be performed under an inert atmosphere, e.g., argon. In this high-temperature process, the pitch is decomposed to form a carbon coating that covers surfaces of the P—Si, including both internal and external pore surfaces. In some embodiments, the carbon coating is a continuous coating that fills and seals external pores of the porous silicon particle.

In any of the foregoing embodiments, the method of making C/P—Si may further include forming an additional carbon coating on at least a portion of an outer surface of the C/P—Si particles. In some embodiments, the additional carbon coating is provided on at least 50%, at least 75%, at least 80%, or at least 90% of the outer surface. In some embodiments, the additional carbon coating is provided on 50-100%, 75-100%, 75-95%, or 75-90% of the outer surface. The additional outer carbon coating may aid in blocking surface pores, thereby reducing or eliminating electrolyte penetration into the C/P—Si composite when an anode comprising the C/P—Si composite is used in a battery. In some embodiments, the additional carbon coating is formed by subsequently contacting the carbon-coated porous silicon particles with a subsequent carbon-containing precursor and subjecting the carbon-coated porous silicon particles to conditions effective to decompose the subsequent carbon-containing precursor, thereby forming the additional carbon coating on at least a portion of an outer surface of the C/SiC-coated porous silicon particles. In some embodiments, the conditions effective to decompose the subsequent carbon precursor vapor include a temperature $T_C > 400°$ C. and time $t' \geq 5$ minutes. In certain embodiments, the temperature $T_C$ is within a range of 400-1000° C., such as 400-900° C., 600-800° C., or 650-750° C., and/or the time t' is within a range of 5 minutes to 3 hours, such as 5-60 minutes or 10-30 minutes. The subsequent carbon-containing precursor may be a hydrocarbon, such as a saturated or unsaturated hydrocarbon. Suitable carbon-containing precursors include, but are not limited to, aliphatic and arylaliphatic compounds, such as aromatic alkynes, aliphatic alkynes, aromatic alkenes, aliphatic alkenes, aromatic alkanes, alkanes, and polymers. In some embodiments, the subsequent carbon-containing precursor comprises a hydrocarbon vapor, such as acetylene or phenylacetylene. In certain embodiments, the subsequent carbon-containing precursor comprises pitch.

In one exemplary embodiment, a solution comprising pitch is infiltrated into porous silicon under vacuum. The solvent is then evaporated. The pitch is carbonized by heating the pitch-coated silicon under an inert atmosphere at 650-750° C. for 1-3 hours.

In another exemplary embodiment, the porous silicon is mixed with a slurry or solution comprising pitch at room temperature. The pitch is carbonized by heating the pitch-coated silicon under an inert atmosphere at 650-750° C. for 1-3 hours.

In yet another exemplary embodiment, the porous silicon is mixed with a slurry or solution comprising pitch at room temperature. The pitch is carbonized by heating the pitch-coated silicon at 650-750° C. for 1-3 hours. An additional carbon coating is provided by heating the C/P—Si in an acetylene atmosphere at 650-750° C. for 5-60 minutes.

IV. ANODES AND BATTERIES

Carbon/SiC-coated porous silicon produced by embodiments of the disclosed method is useful as an anode material for batteries, such as lithium ion batteries, and may replace conventional graphite and graphite-SiO anodes. In some embodiments, anodes comprising C/SiC/P—Si made by embodiments of the disclosed method exhibit one or more of the following advantages:
1. higher capacity than commercial anodes comprising graphite and SiO;
2. better electrical conductivity and rate capability than SiO due to the interconnected conductive network;
3. lower volume expansion than Si or SiO during cycling due to the inner porous structure;
4. lower cost of production compared to conventional CVD coating methods;
5. higher initial coulombic efficiency (CE) and/or average cycling CE compared to anodes comprising Si, SiO, C/P—Si, C/SiC/P—Si with a continuous SiC layer or an SiC layer having a thickness >1 nm, and/or C/SiC/P—Si with a conformal outer carbon coating due to low surface area and/or low volume change; and/or
6. longer cycle life and calendar life compared to anodes that do not include the protective SiC.

Additionally, the anodes are a "drop-in" technology that is fully compatible with current methods of making lithium ion batteries.

An anode as disclosed herein comprises a plurality of C/SiC/P—Si and/or C/P—Si particles. In some embodiments, the anode comprises from 20-90 wt % C/SiC/P—Si and/or C/P—Si particles, such as from 30-90 wt %, 40-90 wt %, or 50-90 wt % C/SiC/P—Si and/or C/P—Si particles.

The anode may further include one or more binders and/or conductive additives. Suitable binders include, but are not limited to, polyacrylates (e.g., lithium polyacrylate, LiPAA), polyimides (PI), polyvinyl alcohol, polyvinyl chloride, polyvinyl fluoride, ethylene oxide polymers, polyvinylpyrrolidone, polyurethane, polytetrafluoroethylene, polyvinylidene fluoride, polyethylene, polypropylene, styrene-butadiene rubber, epoxy resin, nylon, carboxymethyl cellulose, and the like. Suitable conductive additives include, but are not limited to, carbon black, acetylene black, Ketjen black, carbon fibers (e.g., vapor-grown carbon fiber), metal powders or fibers (e.g., Cu, Ni, Al), and conductive polymers (e.g., polyphenylene derivatives). In some embodiments, the anode is prelithiated to at least 5% of capacity, at least 10% of capacity, at least 20% of capacity, at least 50% of capacity, or up to 100% capacity. Prelithiation is particularly useful when a cathode with no lithium source is used.

Embodiments of the disclosed C/SiC/P—Si and/or C/P—Si particles also may be useful in composite anodes, such as silicon/graphite composite anodes. In some embodiments, a silicon/graphite composite anode comprises 10-80 wt % C/SiC/P—Si and/or C/P—Si particles, 8-12 wt % binder, and 8-82 wt % graphite.

In some embodiments, a lithium ion battery includes an anode comprising C/SiC/P—Si and/or C/P—Si particles as disclosed herein, a cathode, an electrolyte, and optionally a separator. FIG. 5 is a schematic diagram of one exemplary embodiment of a rechargeable battery 500 including a cathode 520, a separator 530 which is infused with an electrolyte, and an anode 540 as disclosed herein. In some embodiments, the battery 500 also includes a cathode current collector 510 and/or an anode current collector 550. The electrolyte may be any electrolyte that is compatible with the anode and suitable for use in a lithium ion battery.

The current collectors can be a metal or another conductive material such as, but not limited to, nickel (Ni), copper (Cu), aluminum (Al), iron (Fe), stainless steel, or conductive carbon materials. The current collector may be a foil, a foam, or a polymer substrate coated with a conductive material. Advantageously, the current collector is stable (i.e., does not corrode or react) when in contact with the anode or cathode and the electrolyte in an operating voltage window of the battery. The anode and cathode current collectors may be omitted if the anode or cathode, respectively, are free standing, e.g., when the anode is a free-standing film, and/or when the cathode is a free-standing film. By "free-standing" is meant that the film itself has sufficient structural integrity that the film can be positioned in the battery without a support material.

Exemplary cathodes for lithium ion batteries include, but are not limited to, Li-rich $Li_{1+w}Ni_xMn_yCo_zO_2$ (x+y+z+w=1, 0≤w≤0.25), $LiNi_xMn_yCo_zO_2$ (NMC, x+y+z=1), $LiCoO_2$, $LiNi_{0.8}Co_{0.15}Al_{0.05}O_2$ (NCA), $LiNi_{0.5}Mn_{1.5}O_4$ spinel, $LiMn_2O_4$ (LMO), $LiFePO_4$ (LFP), $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M^1_x(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}O_2$ (($M^{C1}$, $M^{C2}$, and $M^{C3}$ independently are Fe, Mn, Ni, Co, Cr, Ti, Mg, or, Al; 0≤x≤1; 0≤y≤1, 0≤x+y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y<0.5), $xLi_2MnO_3·(1-x)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤x≤1; 0≤y≤1), $Cr_3O_8$, $Cr_2O_5$, a carbon/sulfur composite, or an air electrode (e.g., a carbon-based electrode comprising graphitic carbon and, optionally, a metal catalyst such as Ir, Ru, Pt, Ag, or Ag/Pd). In an independent embodiment, the cathode may be a lithium conversion compound, such as $Li_2O_2$, $Li_2S$, or LiF. In some examples, the cathode is an NMC cathode.

The separator may be glass fiber, a porous polymer film (e.g., polyethylene- or polypropylene-based material) with or without a ceramic coating, or a composite (e.g., a porous film of inorganic particles and a binder). One exemplary polymeric separator is a Celgard® K1640 polyethylene (PE) membrane. Another exemplary polymeric separator is a Celgard® 2500 polypropylene membrane. Another exemplary polymeric separator is a Celgard® 3501 surfactant-coated polypropylene membrane. The separator may be infused with an electrolyte.

In some embodiments, lithium ion batteries including anodes comprising C/P—Si as disclosed herein exhibit a capacity retention of at least 80% after 50 cycles. In certain embodiments, a lithium ion battery including an anode comprising C/P—Si as disclosed herein exhibits a capacity retention of at least 75% over 400 cycles. In some embodiments, lithium ion batteries including anodes comprising C/P—Si as disclosed herein exhibit a coulombic efficiency of at least 95%, such as at least 98% at least 99%, at least 99.5%, or at least 99.8% after an initial 10-20 cycles. In some embodiments, lithium ion batteries including anodes comprising C/SiC/P—Si exhibit a capacity retention of at least 90% or at least 95% after 500 cycles. In certain embodiments, the batteries exhibit a coulombic efficiency of at least of at least 95%, such as at least 98% at least 99%, at least 99.5%, or at least 99.8% after an initial 10-20 cycles. Surprisingly, in some embodiments, a lithium ion battery including an anode comprising C/SiC/P—Si prepared by the method disclosed herein has a significantly increased cycle life compared to a lithium ion battery including an anode comprising C/SiC-coated porous silicon prepared by a method that does not include the pretreatment step performed at the temperature $T_2$ within a range of 120-350° C., such as 120-300° C., and the time $t_1$ within a range of 10 minutes to 10 hours.

V. REPRESENTATIVE EMBODIMENTS

Several non-limiting representative embodiments are described in the following paragraphs.

A coated porous silicon particle, comprising: a porous silicon particle comprising a plurality of interconnected silicon nanoparticles, interconnected silicon nanoparticles being connected to at least one other silicon nanoparticle, and a plurality of pores defined by the interconnected silicon nanoparticles; and a heterogeneous layer comprising a discontinuous silicon carbide coating that is discontinuous across a portion of pore surfaces and across a portion of an outer surface of the porous silicon particle, and a continuous carbon coating that covers (i) outer surfaces of the discontinuous SiC coating and (ii) remaining portions of the pore surfaces and the outer surface of the porous silicon particle.

The coated porous silicon particle of the foregoing paragraph, wherein the heterogeneous layer has an average thickness within a range of from 1 nm to 10 nm.

The coated porous silicon particle of either of the foregoing paragraphs, wherein the discontinuous SiC coating has a thickness of less than 1 nm.

The coated porous silicon particle of any of the foregoing paragraphs, wherein the discontinuous SiC coating covers from 20 to 90% of the pore surfaces and outer surface of the porous silicon particle.

The coated porous silicon particle of any of the foregoing paragraphs, wherein the continuous carbon coating extends across outwardly opening surface pores of the porous silicon particle, thereby providing an outer nonporous carbon coating; and the heterogeneous layer coats internal pore surfaces but does not completely fill internal pores of the porous silicon particle.

The coated porous silicon particle of any of the foregoing paragraphs, wherein (i) the silicon nanoparticles have an average diameter within a range of from 1-20 nm; or (ii) the coated porous silicon particle has a size within a range of from 1-20 μm; or (iii) both (i) and (ii).

An anode comprising a plurality of coated porous silicon particles according to any of the foregoing paragraphs. A rechargeable battery system comprising the anode, a cathode, and an electrolyte comprising a solvent and an active salt comprising lithium cations.

A method for making carbon/silicon carbide-coated porous silicon particles, comprising: (a) providing porous silicon particles having H-terminated surface Si atoms; (b) combining the porous silicon particles with carbon-containing precursor molecules to provide a mixture of the porous silicon particles and carbon-containing precursor molecules, wherein the carbon-containing precursor molecules surround outer surfaces of the porous silicon particles and are infiltrated into pores of the porous silicon particles; (c) heating the mixture under conditions effective to break H—Si bonds of a portion of the H-terminated surface Si atoms to provide non-H-terminated surface Si atoms and form bonds between the non-H-terminated surface Si atoms and carbon atoms of some of the carbon-containing precursor molecules, thereby forming intermediate particles comprising Si-carbon-containing precursor moieties and unreacted carbon-containing precursor molecules surrounding the porous silicon particles and infiltrated into the pores; and (d) heating the intermediate particles under conditions effective to form SiC from the Si-carbon-containing precursor moieties and carbonize the remaining unreacted carbon-containing precursors, thereby forming particles comprising a porous silicon particle and a heterogeneous layer on the porous silicon particle, the heterogeneous layer comprising a discontinuous SiC coating that is discontinuous across a portion of pore surfaces and across a portion of an outer surface of the porous silicon particle, and a continuous carbon coating that covers outer surfaces of the SiC coating and remaining portions of the pore surfaces and the outer surface of the porous silicon particle, thereby forming C/SiC-coated porous silicon particles.

The method of the foregoing paragraph, wherein the conditions of step (c) comprise a temperature and time that are insufficient to form SiC or carbonize the unreacted carbon-containing precursors.

The method of any of the foregoing paragraphs, wherein the conditions of step (c) comprise a temperature effective to break the H—Si bonds of from 20-90% of the H-terminated surface Si atoms to provide non-H-terminated surface Si atoms and form bonds between the non-H-terminated surface Si atoms and carbon atoms of some of the carbon-containing precursor molecules.

The method of any of the foregoing paragraphs, wherein (i) the conditions effective to break H—Si bonds of a portion of the H-terminated surface Si atoms comprise a temperature $T_2$ within a range of 120-350° C., and a time $t_1$ within a range of 5 minutes to 10 hours; or ii) the conditions effective to form SiC from the Si-carbon-containing precursor moieties and carbonize the remaining unreacted carbon-containing precursors comprise a temperature $T_3 \geq 400°$ C. and a time $t_2 \geq 5$ minutes; or (iii) both (i) and (ii).

The method of any of the foregoing paragraphs, wherein steps (b) and (c) are performed simultaneously.

The method of any of the foregoing paragraphs, wherein the carbon-containing precursor comprises an unsaturated hydrocarbon.

The method of any of the foregoing paragraphs, wherein the carbon-containing precursor comprises pitch, phenylacetylene, acetylene, ethylene, or any combination thereof.

The method of any of the foregoing paragraphs, wherein subsequently contacting the C/SiC-coated porous silicon particles with a subsequent carbon-containing precursor; and subjecting the C/SiC-coated porous silicon particles to conditions effective to decompose the subsequent carbon-containing precursor, thereby forming the additional carbon coating on at least a portion of an outer surface of the C/SiC-coated porous silicon particles.

The method of the preceding paragraph, wherein the conditions effective to decompose the subsequent carbon-containing precursor comprise a temperature $T_4 > 400°$ C. and a time $t_3 \geq 5$ minutes.

The method of any of the foregoing paragraphs, wherein combining the porous silicon particles with the carbon-containing precursor comprises: infiltrating a liquid carbon-containing precursor into the porous silicon particles; or infiltrating a solution comprising the carbon-containing precursor and an organic solvent into the porous silicon particles and subsequently evaporating the organic solvent; or mechanically mixing the porous silicon particles with the carbon-containing precursor; or infiltrating a vapor comprising the carbon-containing precursor into the porous silicon particles.

A method for making carbon-coated porous silicon particles, comprising: at least partially coating surfaces of porous silicon particles with a carbon-containing precursor at a temperature less than 300° C. to provide carbon precursor-coated porous silicon particles; and heating the carbon precursor-coated porous silicon particles under conditions effective to carbonize the carbon-containing precursor, thereby providing carbon-coated porous silicon particles.

The method of the foregoing paragraph, wherein the conditions effective to carbonize the carbon-containing precursor comprise: a temperature 400° C.; and a time 5 minutes.

The method of any of the foregoing paragraphs, wherein the conditions effective to carbonize the carbon-containing precursor comprise a temperature within a range of 600-800° C. and a time within a range of 5 minutes to 3 hours.

The method of any of the foregoing paragraphs, wherein the carbon-containing precursor comprises a hydrocarbon.

The method of the foregoing paragraph, wherein the hydrocarbon comprises pitch, an aromatic alkyne, an aliphatic alkyne, an aromatic alkene, an aliphatic alkene, or any combination thereof.

The method of either of the foregoing paragraphs, wherein the hydrocarbon comprises pitch.

The method of any of the foregoing paragraphs, wherein the carbon-containing precursor comprises pitch and at least partially coating surfaces of porous silicon particles with the carbon-containing precursor comprises combining the porous silicon particles with pitch to provide a mixture of porous silicon particles and pitch, the method further comprising heating mixture under conditions effective to carbonize the pitch and form the continuous carbon coating.

The method of the foregoing paragraph wherein combining the porous silicon particles with pitch comprises infiltrating a solution comprising pitch and an organic solvent into the porous silicon particles under vacuum and subsequently evaporating the organic solvent.

The method of the foregoing paragraph, further comprising subsequently providing an additional carbon coating by heating the carbon-coated porous silicon particles in acetylene at a temperature within a range of 600-800° C. for at least 5 minutes.

The method of any of the first six paragraphs, wherein: the carbon-containing precursor comprises phenylacetylene; and at least partially coating surfaces of porous silicon particles with the carbon-containing precursor comprises infiltrating phenylacetylene vapor into the porous silicon particles at a temperature within a range of from 120° C. to less than 300° C. to provide phenylacetylene-coated porous silicon particles.

The method of the foregoing paragraph, wherein the carbon-containing precursor further comprises acetylene, the method further comprising heating the phenylacetylene-coated porous silicon particles in an acetylene atmosphere under conditions effective to carbonize the phenylacetylene and acetylene, thereby providing the carbon-coated porous silicon particles. The method of the foregoing paragraph, wherein the carbon-containing precursor further comprises pitch, the method further comprising: infiltrating a solution comprising pitch and an organic solvent into the phenylacetylene-coated porous silicon particles under vacuum; evaporating the organic solvent to provide phenylacetylene- and pitch-coated porous silicon particles; and heating the phenylacetylene- and pitch-coated porous silicon particles under conditions effective to carbonize the phenylacetylene and pitch, thereby providing carbon-coated porous silicon particles.

The method of any of the foregoing paragraphs, wherein the carbon-containing precursor comprises acetylene, and at least partially coating surfaces of porous silicon particles with the carbon-containing precursor comprises infiltrating acetylene vapor into the porous silicon particles.

The method of the foregoing paragraph, wherein the carbon-containing precursor further comprises pitch, and at least partially coating surfaces of porous silicon particles with the carbon-containing precursor further comprises: subsequently infiltrating a solution comprising pitch and an organic solvent into the porous silicon particles under vacuum and then evaporating the organic solvent; or subsequently mechanically mixing the porous silicon particles with the pitch.

The method of any of the foregoing paragraphs, wherein: the porous silicon particles comprise porous silicon nanoparticles; and the carbon-coated porous silicon particles comprise carbon-coated porous silicon microparticles The method of the foregoing paragraph, wherein: (i) the carbon-coated porous silicon microparticles have an average size within a range of from 1 to 10 μm; or (ii) the carbon-coated porous silicon microparticles comprise an outer carbon layer having an average thickness within a range of from 2-10 nm; or (iii) interior pore surfaces of the carbon-coated porous silicon microparticle are carbon coated; (iv) the carbon-coated porous silicon microparticles have a carbon content within a range of from 30-60 wt % carbon; or (v) any combination of (i), (ii), (iii), and (iv).

The method of either of the foregoing paragraphs, wherein the carbon-coated porous silicon microparticles comprise a plurality of silicon nanoparticles interconnected by carbon.

The method of the foregoing paragraph, wherein the silicon nanoparticles have an average size within a range of from 3-5 nm.

A method of making carbon-coated porous silicon particles, comprising: at least partially coating surfaces of the porous silicon particles with an alkyne or alkene to provide pretreated porous silicon particles; at least partially coating surfaces of the pretreated porous silicon particles with a carbon-containing precursor at a temperature less than 300° C. to provide carbon precursor-coated porous silicon particles; and heating the carbon precursor-coated porous silicon particles under conditions effective to carbonize the alkyne and the carbon-containing precursor, thereby providing carbon-coated porous silicon particles.

The method of the foregoing paragraph, wherein the pretreated porous silicon particles are provided by at least partially coating the surfaces of the porous silicon particles with an alkyne, wherein the alkyne is acetylene or phenylacetylene.

The method of the foregoing paragraph, wherein the alkyne is phenylacetylene and at least partially coating surfaces of the porous silicon particles with the phenylacetylene comprises infiltrating phenylacetylene vapor into the porous silicon particles at a temperature within a range of from 120° C. to less than 300° C.

The method of any one of the foregoing three paragraphs, wherein the carbon-containing precursor comprises pitch, an aromatic hydrocarbon, or an aliphatic hydrocarbon, and has a different composition than the alkyne.

The method of any one of the foregoing four paragraphs, wherein the conditions effective to carbonize the alkyne and the carbon-containing precursor comprise a temperature within a range of 600-800° C. and a time within a range of 5 minutes to 3 hours.

An anode comprising carbon-coated porous silicon particles made by the method of any one of the foregoing paragraphs.

A rechargeable battery system, comprising: an anode comprising carbon-coated porous silicon particles made by the method of any one of the foregoing paragraphs; a cathode; and an electrolyte comprising a solvent and an active salt comprising lithium cations.

The rechargeable battery system of the foregoing paragraph, wherein the system has a coulombic efficiency of at least 99.8% after an initial 10 cycles.

VI. EXAMPLES

Example 1

C/P—Si Prepared with Pitch/THF

Porous Si was prepared by heat treatment of SiO at 860° C. in an argon atmosphere, followed by HF etching to remove $SiO_2$. A solution of approximately 11 wt % pitch in THF was infiltrated into porous Si under vacuum. The mixture was then dried in a vacuum oven at 70° C. to evaporate the THF, providing porous Si coated with a thin layer of pitch, which passivates the porous Si surface and prevents subsequent sintering of the Si. The final C/P—Si was obtained by heating the pitch-covered P—Si in argon at 700° C. for 2 hours.

FIGS. 6A-6C show the morphology and structure of the C/P—Si. FIG. 6A is an SEM image, in which micro-sized particles with size ranging from 1 to 10 μm are observed. A carbon layer of 5-10 nm thickness is observed on the surface Si as shown by TEM in FIG. 6B. The STEM image in FIG. 6C shows that the micro-sized C/P—Si particles are composed of interconnected nano-sized primary P—Si particles. The size of these primary particles is around 4 nm, close to that of porous Si precursors, indicating sintering of Si was minimized.

FIGS. 7A and 7B show the cycling stability and coulombic efficiency of the C/P—Si prepared in this example. An Si anode was prepared with the C/P—Si and tested in a coin cell with Li as the counter electrode in different electrolytes (Table 1). The cells were charged/discharged within a voltage window from 0.01 to 3.0V with 0.1 C at the $1^{st}$ cycle and 0.2 C thereafter (1C=2000 mA/g). The $1^{st}$ delithiation capacity was 1915 mAh/g and a capacity retention of 88% was obtained after 50 cycles in baseline electrolyte (FIG. 7A). The cycling coulombic efficiency increased to 99.8% in 20 cycles and remained at this level afterwards in baseline electrolyte, indicating stable SEI formation (FIG. 7B). In comparison, La and Lc3b showed similar capacity and capacity retention to baseline. All La, Lb and Lc3b showed higher cycling CE than baseline due to more stable SEI formation.

TABLE 1

| Name | Formulation |
| --- | --- |
| Baseline | 1.2M $LiPF_6$ in EC-EMC (3:7 by wt.) + 10 wt. % FEC |
| La | LiFSI-DMC-BTFE (molar ratio = 0.51:1.1:2.2) + 1.0 wt % VC + 5 wt % FEC |
| Lb | LiFSI-DMC-TTE (molar ratio = 0.51:1.1:2.2) + 1.0 wt % VC + 5 wt % FEC |
| Lc3b | LiFSI-DMC-OTE (molar ratio = 0.51:0.83:0.42) + 1.0 wt % VC + 5 wt % FEC |

Example 2

C/P—Si Prepared with Pitch/Toluene

Porous Si was prepared by heat treatment of SiO at 860° C. in Ar atmosphere followed by HF etching to remove $SiO_2$. A solution of pitch/toluene (approximately 11 wt % pitch) was infiltrated into the porous Si using a vacuum mixer. The mixture was then dried in a vacuum oven at 70° C. to evaporate toluene. This process covered all the surface of porous Si with a thin layer of carbon precursor (pitch) which can passivate the surface of porous Si and prevent sintering of Si at the subsequent process. The final porous Si—C composite was obtained by treat pitch covered P—Si in Ar at 700° C. for 1 hour. The carbon content was about 45 wt %.

FIGS. 8A and 8B show the cycling stability and coulombic efficiency of the C/P—Si composite in a full cell configuration. An anode comprising the C/P—Si was tested in a coin cell with an NMC532 cathode as the counter electrode. The cell was charged/discharged in the baseline electrolyte of Example 1 within a voltage window from 2.5 to 4.2V with 0.1 C at the $1^{st}$ cycle, 0.2 C at the $2^{nd}$ cycle and 0.5 C (discharge)/0.7 C (charge) thereafter. A capacity check cycle was done at every 50 cycles at 0.2 C. It is clear from FIG. 8A that the sample had a capacity retention of 78% (measured at lower rate as indicated by separate dots shown in FIG. 8A) after 400 cycles. The cycling coulombic efficiency of the sample was higher than 99.9% (FIG. 8B), indicating a more stable SEI layer.

Example 3

C/P—Si Prepared with Pitch $SiO_{1.5}$ precursors were prepared by hydrolysis of 50 mL triethoxysilane in 200 mL of 0.1 M HCl with stirring at room temperature. The white precipitate silsesquioxane was collected by filtration and dried at 80° C. under vacuum. The silsesquioxane powder was calcined in argon at 1000° C. for 5 hours. The resulting powder was immersed in 48% HF solution for one hour and then rinsed in water to obtain a porous Si powder. The P—Si was coated by mixing the powder with a solution or slurry comprising coal tar pitch followed by subsequent carbonization at 700° C. for 2 hours.

Example 4

C/P—Si Prepared with Pitch and Acetylene

Porous Si was prepared by electrochemical etching of boron-doped crystal Si wafers with constant current density of ~200 mA $cm^{-2}$ for 6 mins in 48% hydrofluoric acid/ethanol electrolyte (3:1). Carbon coating was performed by mixing the resultant powder with a solution or slurry comprising coal tar pitch followed by subsequent carbonization at 700° C. for 2 hours. Additional carbon coating of the Si powder was carried out in a quartz tube at 720° C. for 15 min using acetylene as a carbon precursor.

Example 5

C/SiC/P—Si Prepared with Phenylacetylene and Acetylene

Porous SI was prepared by heat treatment of SiO in an argon atmosphere at 860° C. followed by HF etching to remove SiO$_2$. The P—Si was pretreated with phenylacetylene by infiltration of the phenylacetylene into the P—Si at 220° C. for one hour to stably bind the carbon precursor to the Si surface. Carbonization of the phenylacetylene and additional carbon coating was carried out by chemical vapor deposition in a quartz tube at 720° C. for 15 minutes using acetylene as a carbon precursor.

FIG. 9A shows the IR spectra of P—Si before and after phenylacetylene treatment. The peak in the SiH$_x$ (x=1-3) stretching band at 2100 cm$^{-1}$ decreased while the one at 2900 cm$^{-1}$ corresponding to sp3-hybridized CH increased, which indicates H abstraction and C species addition via hydrosilylation between Si—H and unsaturated CC bonds. This IR spectra is consistent with the chemical bonding illustrated in structure III of FIG. 4. The surface coverage of phenylacetylene was calculated to be around 30% based on the relative decrease in peak intensity of SiH$_x$ (x=1-3) stretching band. After treatment, C was chemically bonded to Si surface which promoted formation of a SiC coating layer with a partial coverage on Si during the subsequent high temperature CVD carbon coating process. As shown in FIG. 9B, compared to the fresh/untreated p-Si, a broad hump appeared around 35 degrees in the XRD pattern of the pre-treated samples after CVD, which can be indexed to SiC.

Further evidence of SiC was provided by electron energy loss spectroscopy (EELS) shown in FIGS. 10A-10B. The EELS line scan (10B) shows the Si L edge has a slight shift toward higher energy loss from inner to surface of Si particle while the C edge has a slight shift toward lower energy loss from inner to surface of Si particle. Based on the comparison with SiC reference spectrum, presence of SiC on the surface of Si particles was confirmed and the thickness of SiC was around monolayer or sub-nanometer.

FIGS. 11A and 11B show the morphology and structure of the C/SiC/p-Si. The TEM image of FIG. 11A shows an amorphous carbon/SiC layer of 2-3 nm thickness on the Si surface. The STEM image of FIG. 11B shows that the micro-sized particles are composed of interconnected nano-sized primary particles. The size of these primary particles was around 4 nm, close to that of the porous Si precursors, indicating sintering of Si was minimized. Also observed are the pores as marked by the white arrows, suggesting porosity was well maintained inside the material.

FIGS. 12A and 12B show the cycling stability and coulombic efficiency of the C/SiC/p-Si particles prepared in this example. An anode containing 80% of C/SiC/p-Si particles was first tested in a coin cell with Li as the counter electrode with an electrolyte of 1.2 M LiPF$_6$ in EC-EMC (3:7 by wt.)+10 wt. % FEC. The cells were charged/discharged within a voltage window from 0.01 to 3.0V with 0.1 C at the 1$^{st}$ cycle and 0.2 C thereafter (1 C=2000 mA/g). The cell retained 93% capacity after 30 cycles in (FIG. 12A). The cycling coulombic efficiency increased to 99.8% in 15 cycles and remained at this level afterwards (FIG. 12B), indicating stable SEI formation.

FIGS. 13A and 13B show the long-term cycling stability of the C/SiC/p-Si composite. An anode containing 80% of C/SiC/p-Si particles was tested in a single layer pouch cell using LiCoO$_2$ (3.6 mAh cm$^{-2}$) (13A) and LiNi$_{0.6}$Mn$_{0.2}$Co$_{0.2}$O$_2$ (3.2 mAh cm$^{-2}$) (13B) as cathode and 1.2 M LiPF$_6$ in EC-PC-EMC (1:3:6 by wt)+1 wt % VC+7 wt % FEC as electrolyte. The cells were charged/discharged within a voltage window from 2.75 to 4.35V with 0.1 C at the 1$^{st}$ cycle, 0.2 C at the 2$^{nd}$ cycle and 0.5 C (discharge)/0.7 C (charge) thereafter. A capacity check cycle was done at every 50 cycles at 0.2 C which showed that 98% and 94% capacity retentions were obtained in the Si∥LiCoO$_2$ pouch cell (13A) and Si∥LiNi$_{0.6}$Mn$_{0.2}$Co$_{0.2}$O$_2$ pouch cell (13B), respectively, after 500 cycles. It is clear from FIGS. 13A and 13B that the C/SiC/p-Si composite anode has excellent cycling stability with Si protected by the SiC and carbon heterogenous layer in this unique structure design.

Example 6

C/SiC/P—Si Prepared with Phenylacetylene and Pitch

Precursors for SiO$_{1.5}$ were prepared by hydrolysis of 50 ml triethoxysilane in 200 mL 0.1 M hydrochloric acid solution under stirring at room temperature. The white precipitate silsesquioxane was collected by filtration and then dried at 80° C. under vacuum. The silsesquioxane powder was calcined in Ar at 1000° C. for 5 hours. Then the powder was immersed in 48% hydrofluoric acid solution for 1 hour, then rinsed in water to obtain porous Si powder. The porous Si was pre-treated with phenylacetylene by infiltration of phenylacetylene into porous Si at 220° C. for 1 hour to form a stable binding between the carbon precursor and Si surface. Carbon coating was done by mixing the resultant powder with coal tar pitch followed by subsequent carbonization at 700° C. for 2 hours. During the carbonization process, the carbon precursor chemically bonded to Si surface during the pre-treatment process formed a SiC coating layer on Si surface, and remaining unbound carbon precursors formed a carbon coating.

Example 7

C/SiC/P—Si Prepared with Phenylacetylene, Pitch, and Acetylene

Porous Si was prepared by electrochemical etching of boron-doped crystal Si wafers with constant current density of ~200 mA cm$^{-2}$ for 6 mins in 48% hydrofluoric acid/ethanol electrolyte (3:1). The obtained porous Si was then pre-treated with phenylacetylene by infiltration of phenylacetylene into porous Si at 220° C. for 1 hour to form a stable binding between the carbon precursor and Si surface. After treatment, C is chemically bonded to Si surface which promotes formation of a SiC coating layer during subsequent process. Carbon coating was done by mixing the resultant powder with coal tar pitch followed by subsequent carbonization at 700° C. for 2 hours. Additional carbon coating of the Si powder was carried out in a quartz tube at 720° C. for 15 min using acetylene as a carbon precursor.

Example 8

C/SiC/P—Si Prepared with Phenylacetylene and Pitch/THF

Porous Si was prepared by heat treatment of SiO at 860° C. in an argon atmosphere followed by HF etching to remove SiO$_2$. The obtained porous Si was then pretreated with phenylacetylene by infiltration of phenylacetylene into porous Si at 220° C. for 1 hour to form a stable binding between the carbon-containing precursor and Si surface. A solution of pitch/THF (approximately 11 wt % pitch) was infiltrated into the prepared porous Si under vacuum. The mixture was then dried in a vacuum oven at 70° C. to evaporate THF. This process covered the entire surface of the porous Si with a thin layer of carbon precursor (pitch)

which further passivates surface of the porous Si and prevents sintering of Si during subsequent carbonization. The final C/SiC/P—Si composite was obtained by heating the pitch covered P—Si in Ar at 700° C. for 2 hours. During the carbonization process, the carbon precursor chemically bonded to Si surface during pre-treatment process formed a discontinuous SiC coating layer on the Si surface and the remaining unbound carbon precursor and pitch formed a carbon coating.

Example 9

C/SiC/P—Si Prepared with Acetylene and Pitch

Precursors for $SiO_{1.5}$ were prepared by hydrolysis of 50 mL triethoxysilane in 200 mL 0.1 M hydrochloric acid solution under stirring at room temperature. The white precipitate silsesquioxane was collected by filtration and then dried at 80° C. under vacuum. The silsesquioxane powder was calcined in Ar at 1000° C. for 5 hours. Then the powder was immersed in 48% hydrofluoric acid solution for 1 hour to obtain porous Si powder. The porous Si was pretreated with acetylene by infiltration of acetylene into the porous Si in a quartz tube at 220° C. for 1 hour to form a stable bond between the carbon precursor and the Si surface. Carbon coating was done by mixing the resultant powder with coal tar pitch followed by subsequent carbonization at 700° C. for 2 hours. During the carbonization process, the carbon precursor chemically bonded to the Si surface during pre-treatment process formed a SiC coating layer on Si surface and the remaining unbound carbon precursor and pitch formed a carbon coating.

Example 10

C/SiC/P—Si Prepared with Acetylene and Pitch/THF

Porous Si was prepared by electrochemical etching of boron-doped crystal Si wafers with constant current density of ~200 mA $cm^{-2}$ for 6 mins in 48% hydrofluoric acid/ethanol electrolyte (3:1). The porous Si was pretreated with acetylene by infiltration of acetylene into the porous Si in a quartz tube at 220° C. for 1 hour to form a stable bond between the carbon precursor and the Si surface. A solution of pitch/THF (approximately 11 wt % pitch) was infiltrated into the porous Si under vacuum. The mixture was dried in a vacuum oven at 70° C. The final porous Si—C composite was obtained by carbonizing the mixture in Ar at 700° C. for 2 hours. During the carbonization process, the carbon precursor chemically bonded to the Si surface during pre-treatment process formed a SiC coating layer on Si surface and the remaining unbound carbon precursor and pitch formed a carbon coating.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for making carbon/silicon carbide-coated porous silicon particles, comprising:
    (a) providing porous silicon particles having H-terminated surface Si atoms;
    (b) combining the porous silicon particles with carbon-containing precursor molecules to provide a mixture of the porous silicon particles and carbon-containing precursor molecules, wherein the carbon-containing precursor molecules surround outer surfaces of the porous silicon particles and are infiltrated into pores of the porous silicon particles;
    (c) heating the mixture at a temperature of 120° C. to 350° C. for a time of 10 minutes to 10 hours to break H—Si bonds of a portion of the H-terminated surface Si atoms to provide non-H-terminated surface Si atoms and form bonds between the non-H-terminated surface Si atoms and carbon atoms of some of the carbon-containing precursor molecules, thereby forming intermediate particles comprising Si-carbon-containing precursor moieties and unreacted carbon-containing precursor molecules surrounding the porous silicon particles and infiltrated into the pores; and
    (d) heating the intermediate particles at a temperature ≥400° C. for a time of ≥5 minutes to form SiC from the Si-carbon-containing precursor moieties and carbonize the remaining unreacted carbon-containing precursors, thereby forming particles comprising a porous silicon particle and a heterogeneous layer on the porous silicon particle, the heterogeneous layer comprising a discontinuous SiC coating that is discontinuous across a portion of pore surfaces and across a portion of an outer surface of the porous silicon particle, and a continuous carbon coating that covers (i) outer surfaces of the SiC coating and (ii) remaining portions of the pore surfaces and the outer surface of the porous silicon particle, thereby forming C/SiC-coated porous silicon particles.

2. The method of claim 1, wherein the temperature and time of step (c) are insufficient to form SiC or carbonize the unreacted carbon-containing precursors.

3. The method of claim 1, wherein the temperature and time of step (c) break the H—Si bonds of from 20-90% of the H-terminated surface Si atoms to provide non-H-terminated surface Si atoms and form bonds between the non-H-terminated surface Si atoms and carbon atoms of some of the carbon-containing precursor molecules.

4. The method of claim 1, wherein steps (b) and (c) are performed simultaneously.

5. The method of claim 1, wherein the carbon-containing precursor comprises an unsaturated hydrocarbon.

6. The method of claim 1, wherein the carbon-containing precursor comprises an aromatic alkyne, an aliphatic alkyne, an aromatic alkene, an aliphatic alkene, a polymer comprising at least one unsaturated carbon-carbon bond, or any combination thereof.

7. The method of claim 1, wherein the carbon-containing precursor comprises pitch, phenylacetylene, acetylene, ethylene, or any combination thereof.

8. The method of claim 1, further comprising:
    subsequently contacting the C/SiC-coated porous silicon particles with a subsequent carbon-containing precursor; and
    subjecting the C/SiC-coated porous silicon particles to a temperature >400° C. for a time ≥5 minutes to decompose the subsequent carbon-containing precursor, thereby forming an additional carbon coating on at least a portion of an outer surface of the C/SiC-coated porous silicon particles.

9. The method of claim 1, wherein combining the porous silicon particles with the carbon-containing precursor comprises:

infiltrating a liquid carbon-containing precursor into the porous silicon particles; or infiltrating a solution comprising the carbon-containing precursor and an organic solvent into the porous silicon particles and subsequently evaporating the organic solvent; or mechanically mixing the porous silicon particles with the carbon-containing precursor; or infiltrating a vapor comprising the carbon-containing precursor into the porous silicon particles.

10. The method of claim 1, wherein the intermediate particles are heated at 400° C. to 1000° C. for 5 minutes to 5 hours.

11. The method of claim 8, wherein the C/SiC-coated porous silicon particles are subjected to a temperature of 600° C. to 800° C. for a time of 5 minutes to 3 hours.

* * * * *